(12) United States Patent
Philip et al.

(10) Patent No.: US 9,982,894 B1
(45) Date of Patent: May 29, 2018

(54) ELECTRONIC CONTROL ASSEMBLY FOR AN APPLIANCE

(71) Applicant: Haier US Appliance Solutions, Inc., Wilmington (DE)

(72) Inventors: Elvin Thomas Philip, LaFayette, GA (US); Anthony Michael Shaw, Chattanooga, TN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days. days.

(21) Appl. No.: 15/626,223

(22) Filed: Jun. 19, 2017

(51) Int. Cl.
*F24C 7/08* (2006.01)
*F16B 5/02* (2006.01)

(52) U.S. Cl.
CPC ............ *F24C 7/082* (2013.01); *F16B 5/0208* (2013.01)

(58) Field of Classification Search
CPC ...... H03K 17/96; H03K 17/962; H05K 13/02; H05K 7/14
See application file for complete search history.

(56) References Cited

U.S. PATENT DOCUMENTS 5,653,221 A    8/1997   Luken et al.

FOREIGN PATENT DOCUMENTS

| CN | 200962711 Y | 10/2007 |
|---|---|---|
| KR | 20010025855 A | 4/2001 |
| WO | WO2016000769 A1 | 1/2016 |

*Primary Examiner* — Daniel J Wiley
(74) *Attorney, Agent, or Firm* — Dority & Manning, P.A.

(57) ABSTRACT

An electronic control assembly for an appliance can include features that provide for ergonomic assembly of the electronic control assembly, as well as a sturdy fit and feel when the electronic control assembly is fully assembled. Electronic control assembly can include features that reduce the number of fasteners, such as e.g., screws, required to assemble electronic control assembly.

20 Claims, 16 Drawing Sheets

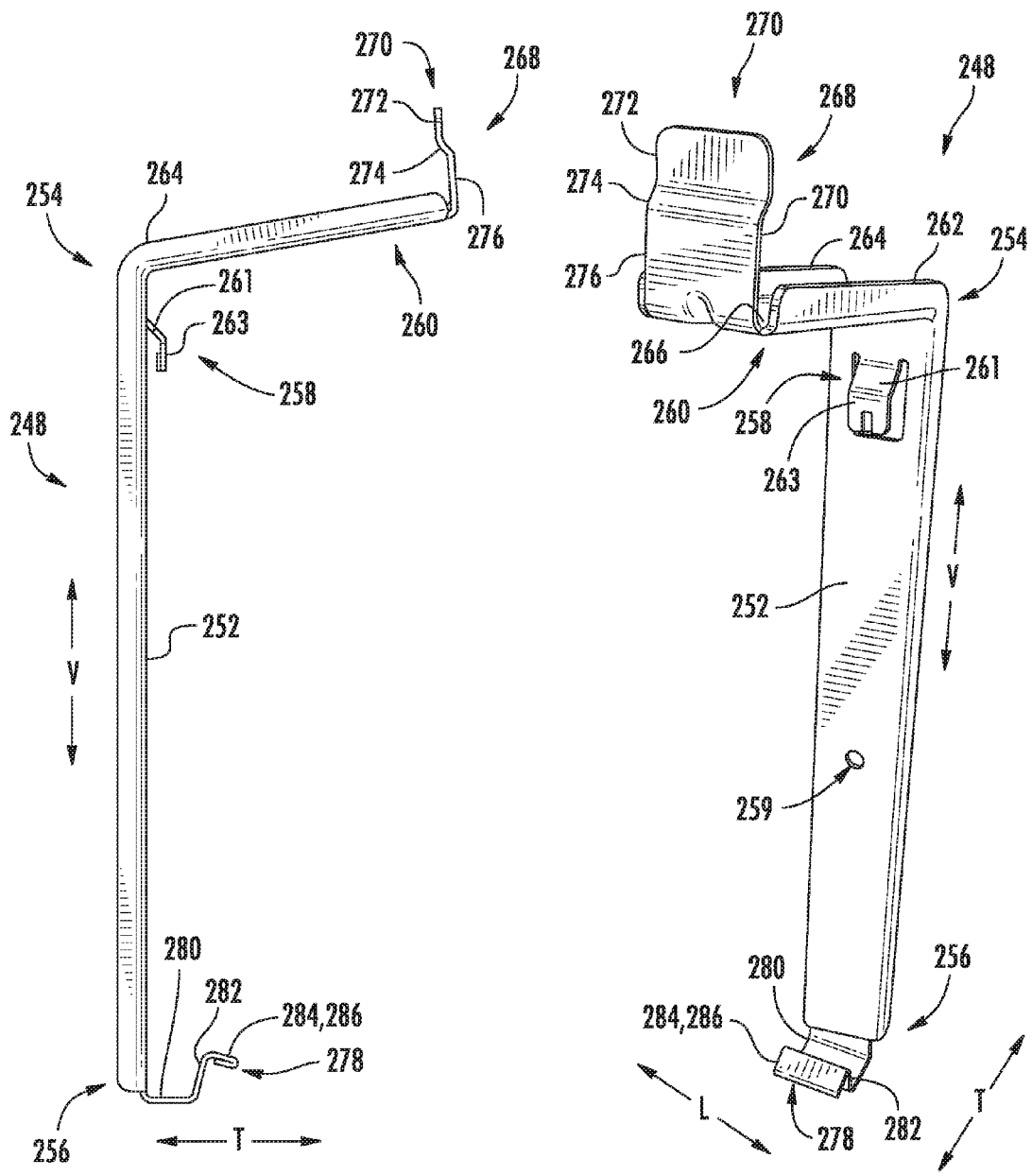

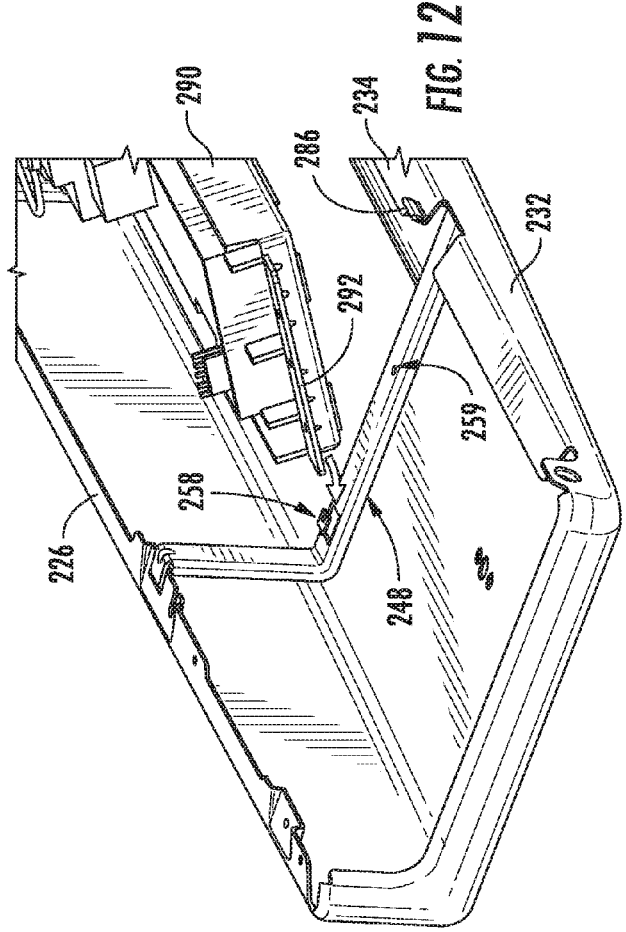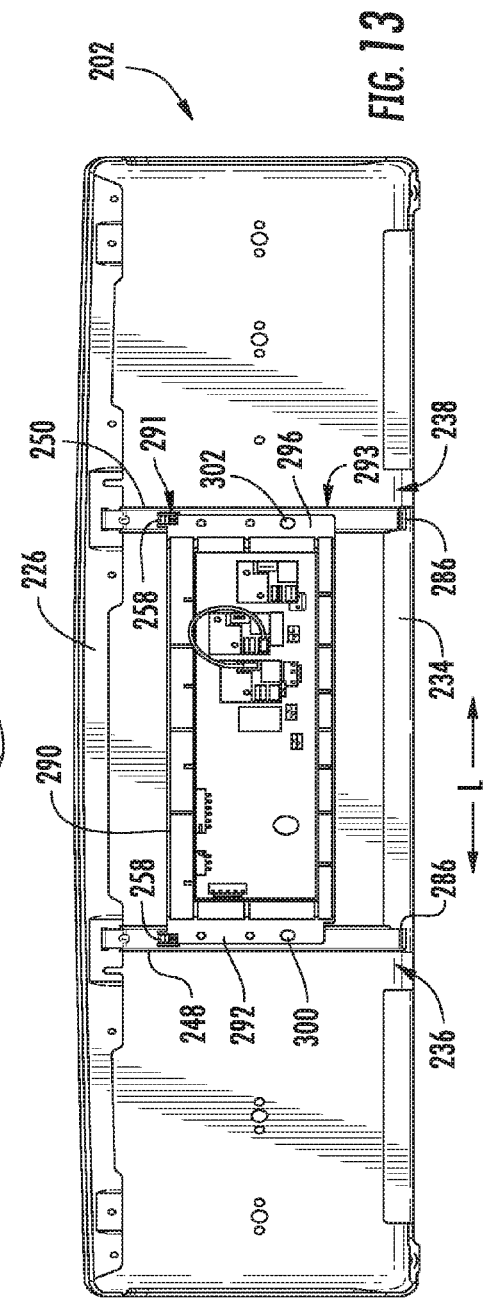

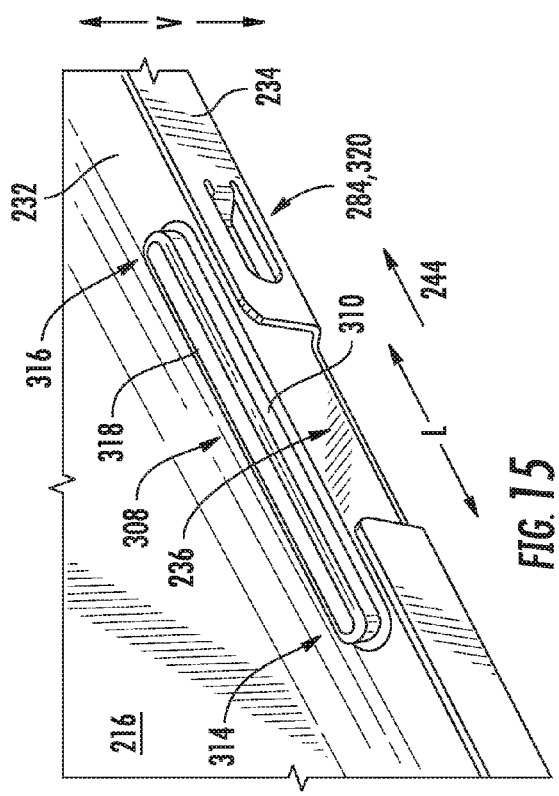
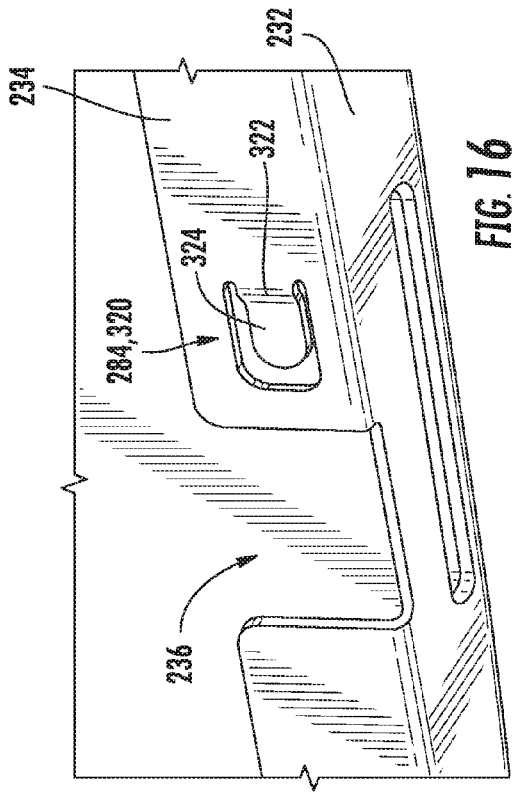
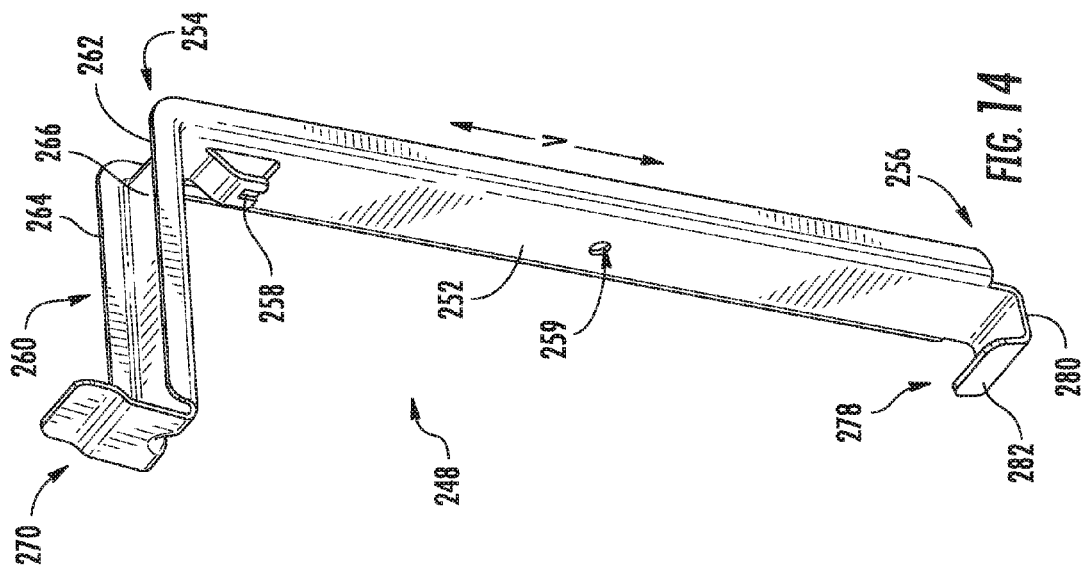

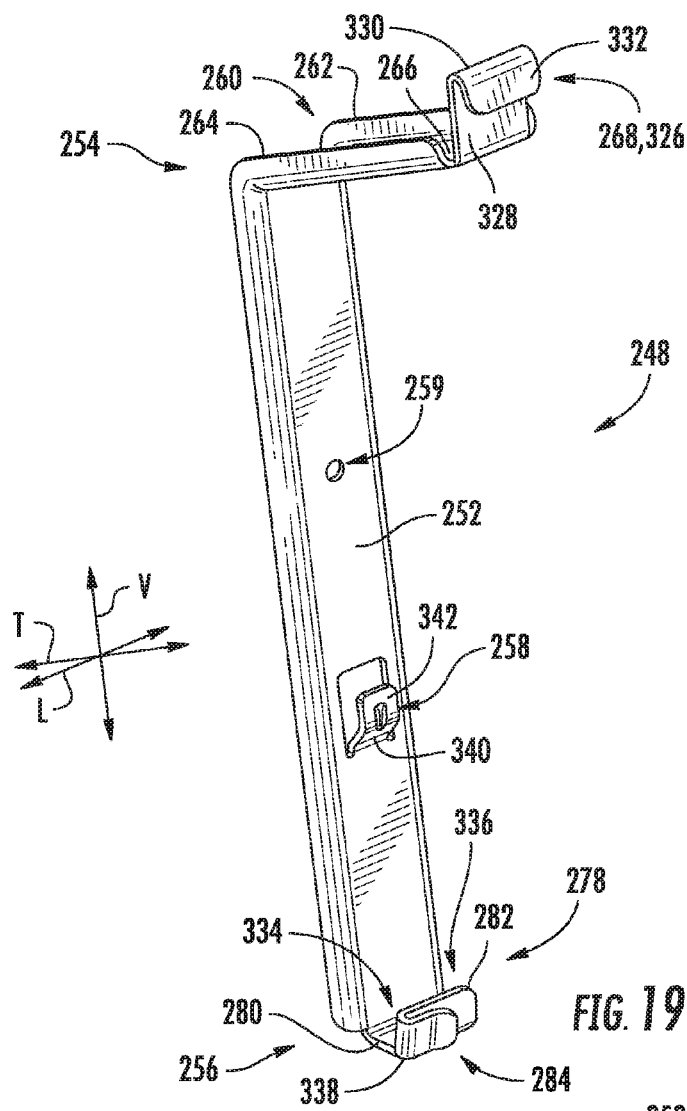
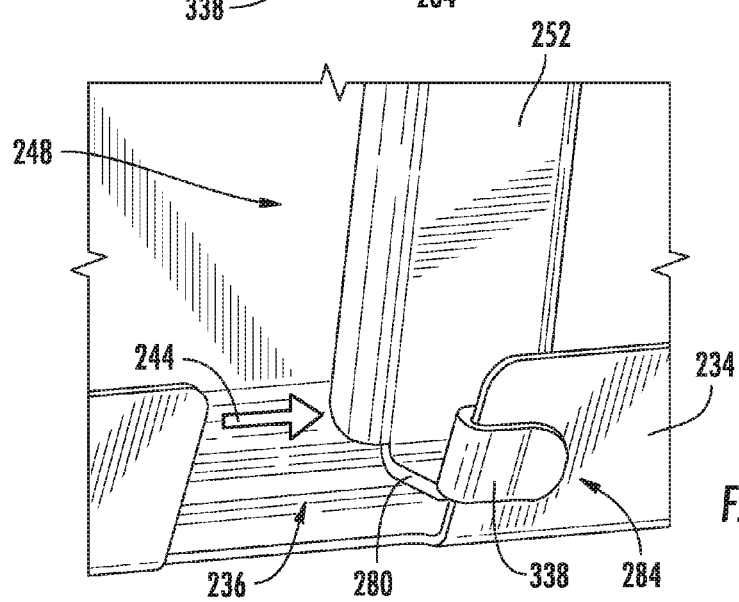

ELECTRONIC CONTROL ASSEMBLY FOR AN APPLIANCE

FIELD OF THE INVENTION

The present subject matter relates generally to appliances and more particularly to electronic control assemblies for appliances.

BACKGROUND OF THE INVENTION

Various appliances, such as oven appliances, include electronic control assemblies that provide a user interface and various control features for operation of the appliance. Electronic control assemblies are typically assembled by attaching an electronic control board to brackets that are in turn attached to a control panel. The brackets structurally support the electronic control board in place and provide the electronic control assembly with a sturdy fit and feel.

Conventional electronic control assemblies have been assembled by first attaching the brackets to the control panel via multiple screws. The electronic control board is then attached to the brackets via additional screws. In some cases, many screws are needed to assemble such conventional electronic control assemblies. Accordingly, the process of assembling a conventional electronic control assembly has been tedious and time consuming. Other conventional electronic control assemblies include spring steel brackets so that the use of screws can be avoided. However, such brackets require special spring steel material, and during assembly, a considerable amount of force is required to snap fit such brackets in place. The force required to snap fit such steel spring brackets can result in ergonomic issues in high production volume environments.

Accordingly, an electronic control assembly for an appliance that addresses these noted challenges would be useful. Specifically, an electronic control assembly for an appliance that can be assembled ergonomically with fewer fasteners would be beneficial.

BRIEF DESCRIPTION OF THE INVENTION

The present subject matter provides an electronic control assembly for an appliance. The electronic control assembly can include features that provide for ergonomic assembly of the electronic control assembly, as well as a sturdy fit and feel when the electronic control assembly is fully assembled. Moreover, electronic control assembly can include features that reduce the number of fasteners, such as e.g., screws, required to assemble electronic control assembly. Additional aspects and advantages of the invention will be set forth in part in the following description, or may be apparent from the description, or may be learned through practice of the invention.

In one exemplary aspect, an electronic control assembly for an appliance is provided. The electronic control assembly defines a vertical direction, a lateral direction, and a transverse direction. The electronic control assembly includes a control panel having a front side and a rear side and defining a panel opening therethrough, the control panel extending between a top and a bottom along the vertical direction. The control panel further includes a top wall projecting rearward along the transverse direction from the top of the control panel, the top wall having a top flange projecting therefrom along the vertical direction and extending along the lateral direction, the top flange defining a first slot and a second slot. The control panel also includes a bottom wall projecting rearward along the transverse direction from the bottom of the control panel, the bottom wall having a bottom flange projecting therefrom along the vertical direction and extending along the lateral direction, the bottom flange defining a first bottom flange opening and a second bottom flange opening. The electronic control assembly further includes a pair of brackets including a first bracket and a second bracket, each bracket positioned on the rear side of the control panel and on opposite sides of the panel opening. Each bracket includes a body extending between a top and a bottom along the vertical direction and including a body tab. Each bracket also includes a top arm extending from the top of the body and including a tab insertable into one of the slots of the top flange for securing the top arm to the control panel. Each bracket further includes a bottom arm extending from the bottom of the body and insertable into one of the flange openings. At least one of the bottom arm of the first bracket and the bottom flange includes a securing mechanism for securing the bottom of the first bracket to the control panel when the first bracket is slid in the lateral direction and wherein at least one of the bottom arm of the second bracket and the bottom flange includes a securing mechanism for securing the bottom of the second bracket to the control panel when the second bracket is slid in the lateral direction. The electronic control assembly also includes a control board sized to fit the panel opening and to overlap each of the brackets, wherein the control board is secured to the brackets at least in part by the body tabs of each bracket. Moreover, the electronic control assembly also includes one or more fasteners for further securing the control board in engagement with each of the brackets.

In another exemplary aspect, an electronic control assembly for an appliance is provided. The electronic control assembly defines a vertical direction, a lateral direction, and a transverse direction. The electronic control assembly includes a control panel having a front side and a rear side and defining a panel opening therethrough, the control panel extending between a top and a bottom along the vertical direction. The control panel further includes a top wall projecting rearward from the top of the control panel, the top wall having a top flange projecting therefrom along the vertical direction and extending along the lateral direction, the top flange defining a first slot and a second slot. The control panel also includes a bottom wall projecting rearward from the bottom of the control panel, the bottom wall having a bottom flange projecting therefrom along the vertical direction and extending along the lateral direction, the bottom flange defining a first bottom flange opening and a second bottom flange opening, the bottom flange further defining a first step cutout proximate the first bottom flange opening and a second step cutout positioned proximate the second bottom flange opening. The electronic control assembly also includes a pair of brackets, each bracket positioned on the rear side of the control panel and on opposite sides of the panel opening. Each bracket includes a body extending between a top and a bottom along the vertical direction and including a body tab. Each bracket further includes a top arm extending from the top of the body and including a tab insertable into one of the slots of the top flange for securing the top arm to the control panel. Each bracket also includes a bottom arm extending from the bottom of the body and insertable into one of the bottom flange openings such that the bottom arm can be slid in the lateral direction into locking engagement with one of the step cutouts for securing the bottom arm to the control panel. The electronic control assembly also includes a control board sized to fit the panel opening and to overlap each of the brackets, wherein the control board is secured to the brackets at least in part by the body tabs of each bracket. In addition, the electronic control assembly includes one or more fasteners for further securing the control board in engagement with each of the brackets.

In another exemplary aspect, an electronic control assembly for an appliance is provided. The electronic control assembly includes a control panel including a main panel having a front side and a rear side and defining a panel opening therethrough, the main panel extending between a top and a bottom. The control panel further includes a top flange spaced apart from the main panel, the top flange defining a first slot and a second slot. The control panel also includes a top wall extending between the main panel and the top flange. Moreover, the control panel further includes a bottom flange spaced apart from the main panel, the bottom flange defining a first bottom flange opening and a second bottom flange opening. In addition, the control panel includes a bottom wall extending between the main panel and the bottom flange. The electronic control assembly also includes a pair of brackets including a first bracket and a second bracket, each bracket positioned on the rear side of the main panel and on opposite sides of the panel opening. Each bracket includes a body extending between a top and a bottom and including a body tab. Each bracket further includes a top arm extending from the top of the body and including a tab insertable into one of the slots of the top flange for securing the top arm to the control panel. Moreover, each bracket includes a bottom arm extending from the bottom of the body and insertable into one of the flange openings. At least one of the bottom arm of the first bracket and the bottom flange includes a securing mechanism for securing the bottom of the first bracket to the control panel when the bottom arm is slid into engagement with the bottom flange and wherein at least one of the bottom arm of the second bracket and the bottom flange includes a securing mechanism for securing the bottom of the second bracket to the control panel when the bottom arm is slid into engagement with the bottom flange. The electronic control assembly also includes a control board sized to fit the panel opening and to overlap each of the brackets, wherein the control board is secured to the brackets at least in part by the body tabs of each bracket. In addition, the electronic control assembly includes one or more fasteners for further securing the control board in engagement with each of the brackets.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 7 provides a side view of an exemplary bracket according to exemplary embodiments of the present disclosure;

FIG. 8 provides a perspective view of the bracket of FIG. 7;

FIG. 12 provides a perspective view of an exemplary control board being attached to the exemplary brackets of FIG. 9;

FIG. 13 provides a rear view of the control board attached to the control panel of FIG. 9;

FIG. 14 provides a perspective view of an exemplary bracket according to an exemplary embodiment of the present disclosure;

FIG. 15 provides a close up view of an exemplary emboss protruding from a bottom wall of an exemplary control panel according to an exemplary embodiment of the present disclosure;

FIG. 16 provides a bottom perspective view of the control panel of FIG. 15 depicting an exemplary bottom flange that includes a securing mechanism positioned proximate a bottom flange opening defined by the bottom flange;

FIG. 19 provides a perspective view of an exemplary bracket according to an exemplary embodiment of the present disclosure;

FIG. 20 provides a perspective view of the bracket of FIG. 19 secured by its securing mechanism to a bottom flange of an exemplary control panel according to an exemplary embodiment of the present disclosure;

DETAILED DESCRIPTION

Figure 1:
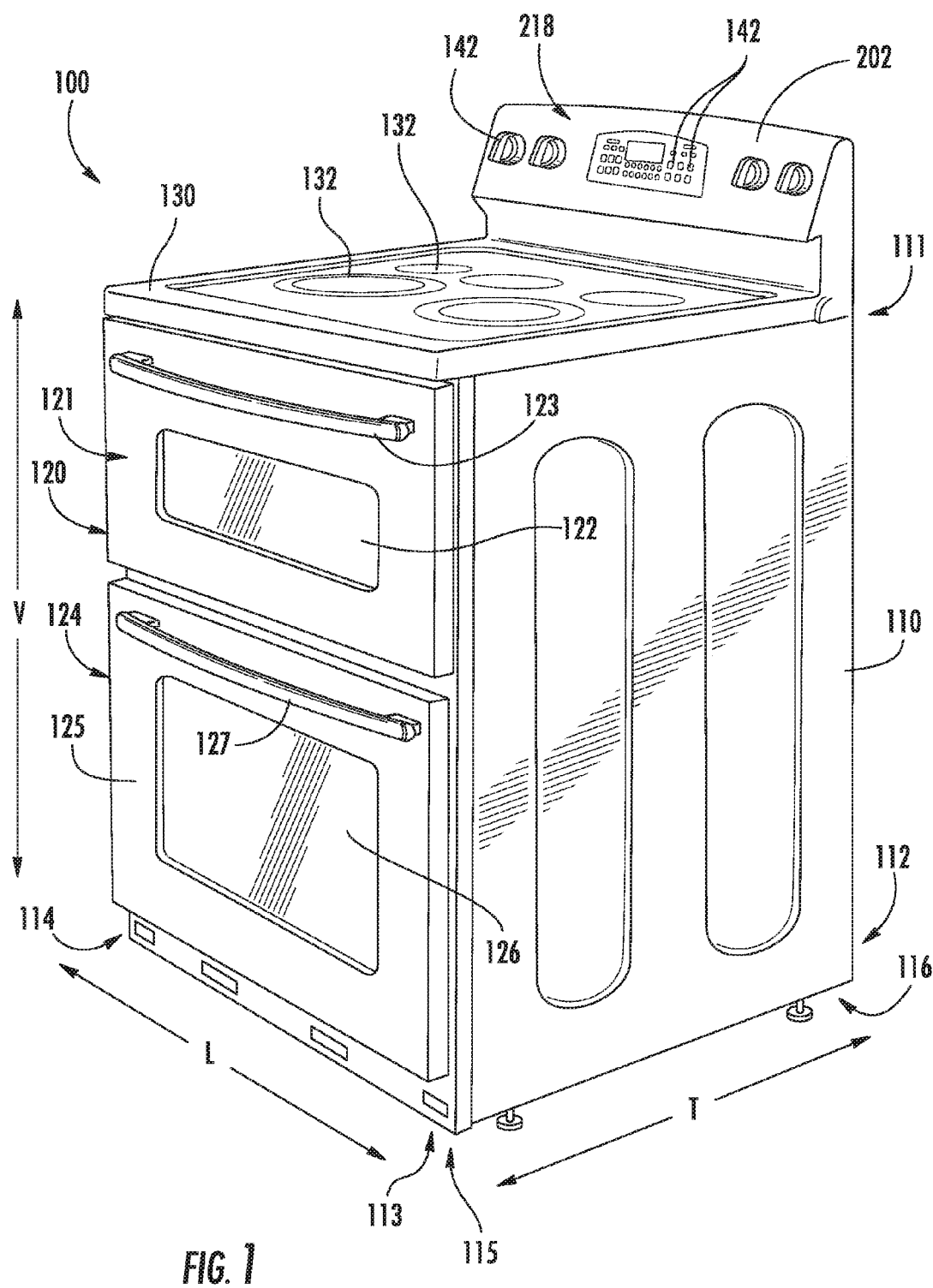
FIG. 1 provides a perspective view of an oven range appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

"Substantially" means within at least about twenty degrees (20°) of the noted direction or within manufacturing tolerances, whichever margin is greater, unless specifically stated otherwise. "Generally" means within at least about forty-five degrees (45°) of the noted direction or within manufacturing tolerances, whichever margin is greater, unless specifically stated otherwise.

FIG. 1 provides a perspective view of an oven range appliance 100 according to exemplary embodiments of the present disclosure. Range appliance 100 defines a vertical direction V, a lateral direction L, and a transverse direction T. The vertical, lateral and transverse directions are mutually perpendicular and form an orthogonal direction system.

Range appliance 100 includes an insulated cabinet 110. Cabinet 110 extends between a top portion 111 and a bottom portion 112, e.g., along the vertical direction V. Thus, top and bottom portions 111, 112 of cabinet 110 are spaced apart from each other, e.g., along the vertical direction V. Cabinet 110 also extends between a first side portion 113 and a second side portion 114, e.g., along the lateral direction L. Thus, first and second side portions 113, 114 of cabinet 110 are spaced apart from each other, e.g., along the lateral direction L. Cabinet 110 further extends between a front portion 115 and a back portion 116, e.g., along the transverse direction T. Thus, front and back portions 115, 116 of cabinet 110 are spaced apart from each other, e.g., along the transverse direction T.

Range appliance 100 includes a cooktop 130 positioned at or adjacent top portion 111 of cabinet 110. Cooktop 130 includes various heating elements 132, such as gas burners, electric resistance elements, induction elements, etc., that are configured for heating cookware positioned thereon. As may be seen in FIG. 1, cabinet 110 also defines an upper cooking chamber 120 and a lower cooking chamber 124. Thus, range appliance 100 is generally referred to as a double oven range appliance. As will be appreciated, range appliance 100 is provided by way of example only and the present subject matter may be used in any suitable oven appliance, e.g., a single oven range appliance, a single wall oven appliance, a double wall oven appliance, etc. Moreover, it will further be appreciated that the subject matter of the present disclosure can be applied to other appliances as well, including, for example, washing machine appliances, dryer appliances, refrigerator appliances, freezer appliances, microwave appliances, etc. In addition, it will further be appreciated that the present subject matter can be applied to any suitable application in which an electronic control assembly is attached to a control panel.

Upper cooking chamber 120 is positioned at or adjacent top portion 111 of cabinet 110. Conversely, lower cooking chamber 124 is positioned at or adjacent bottom portion 112 of cabinet 110 such that upper and lower cooking chambers 120, 124 are spaced apart from each other along the vertical direction V. Upper and lower cooking chambers 120, 124 are configured for receipt of one or more food items to be cooked. Range appliance 100 includes an upper door 121 and a lower door 125 that are attached or coupled to cabinet 110, e.g., with slide assemblies and hinges, in order to permit selective access to upper cooking chamber 120 and lower cooking chamber 124, respectively. Handles 123, 127 are mounted to upper and lower doors 121, 125 to assist users with opening and closing doors 121, 125 in order to access cooking chambers 120, 124. As an example, a user can pull on handle 123 mounted to upper door 121 to open or close upper door 121 and access upper cooking chamber 120. Glass window panes 122, 126 provide for viewing the contents of upper and lower cooking chambers 120, 124 when doors 121, 125 are closed and also assist with insulating upper and lower cooking chambers 120, 124. Heating elements, such as electric resistance heating elements, gas burners, microwave elements, etc., are positioned within upper and lower cooking chambers 120, 124 of cabinet 110 for heating upper and lower cooking chambers 120, 124.

A control panel 202 of range appliance 100 is positioned at top portion 111 and back portion 116 of cabinet 110. Control panel 202 includes user inputs 142, such as buttons, knobs, etc. Control panel 202 provides selections for user manipulation of the operation of range appliance 100. For example, a user can touch one of user inputs 142 to trigger operation of range appliance 100. In response to user manipulation of user inputs 142, various components of range appliance 100, such as a heating element, can be operated.

Figure 2:
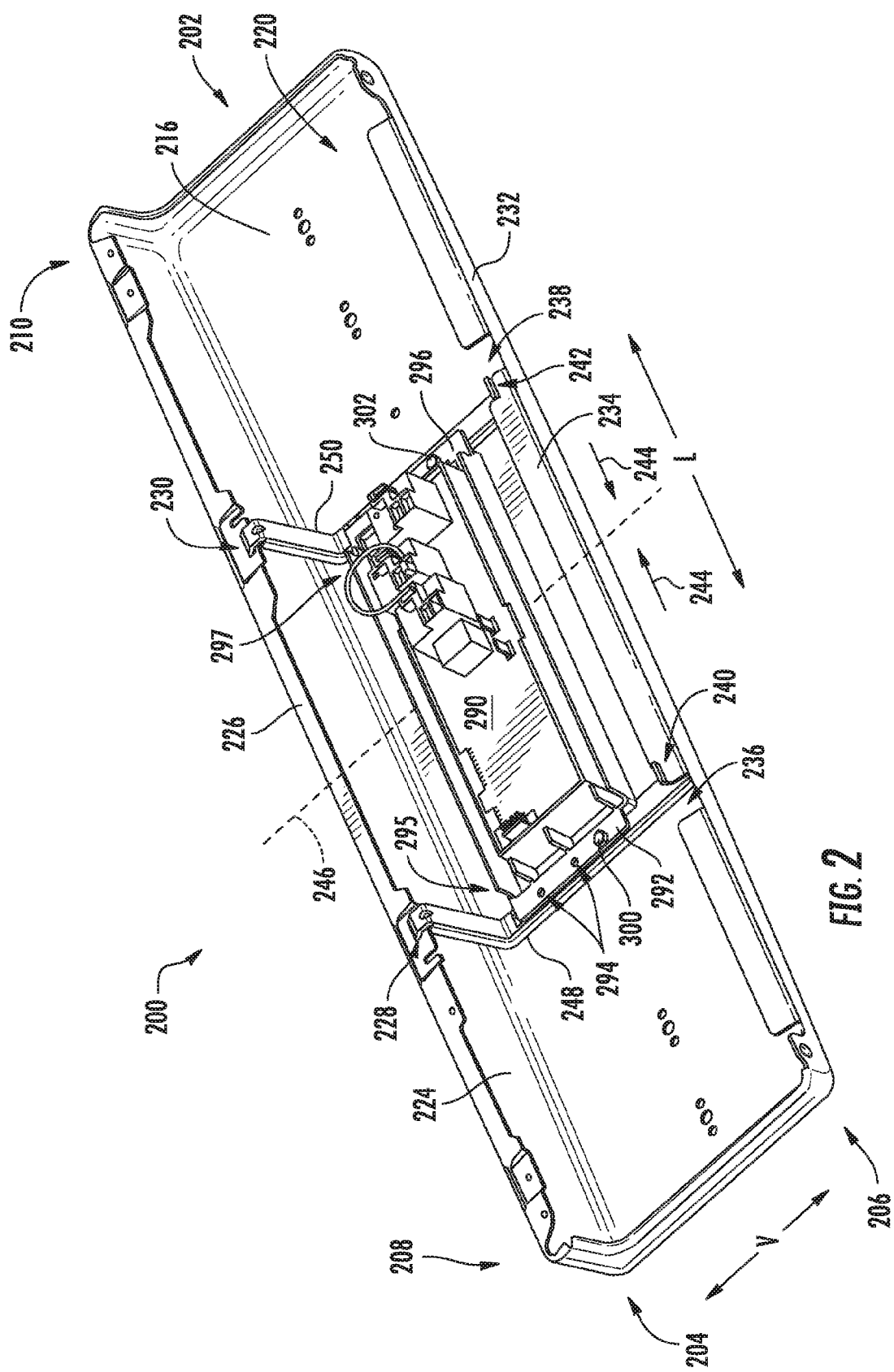
FIG. 2 provides a rear perspective view of an electronic control assembly according to an exemplary embodiment of the present disclosure.
Figure 3:
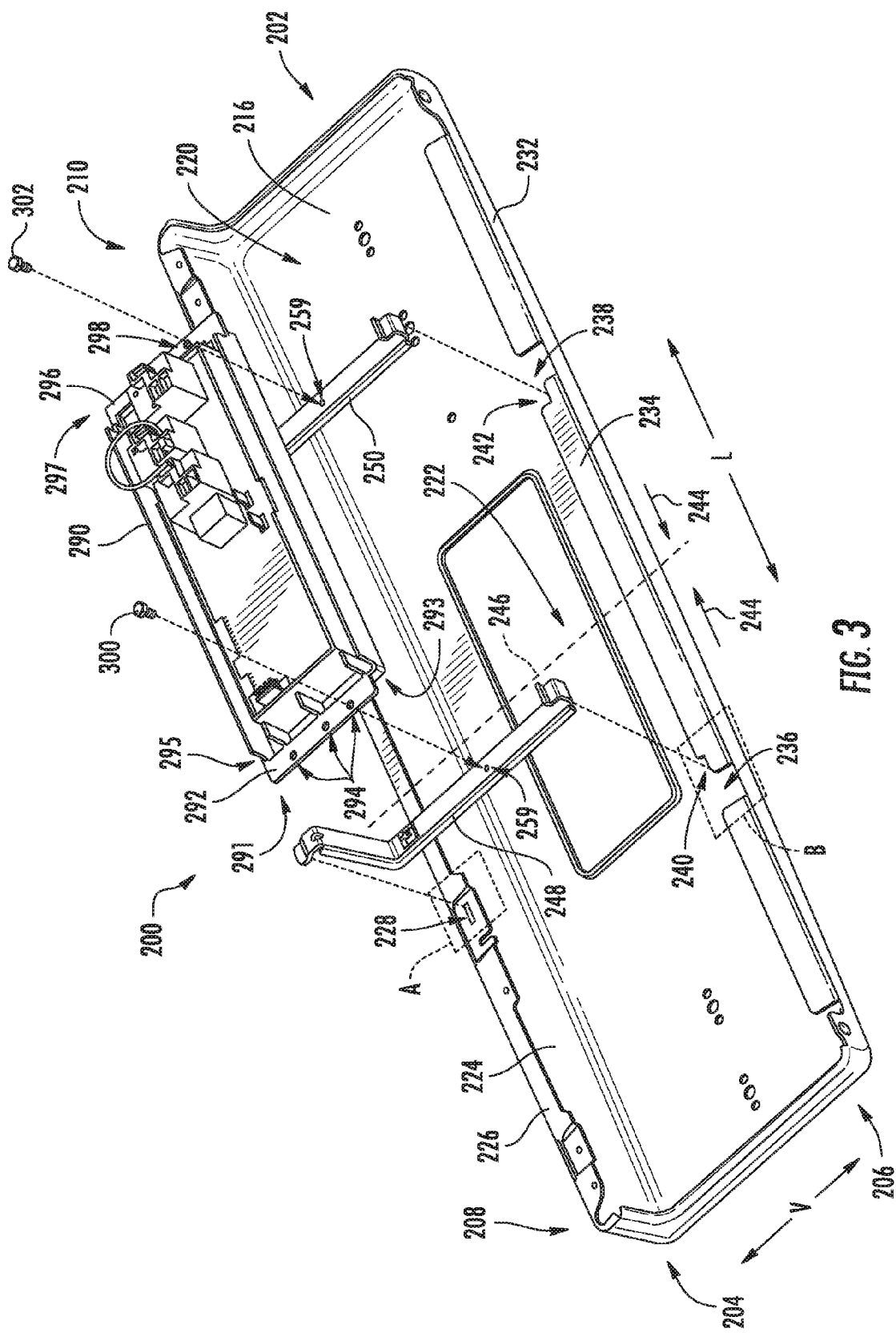
FIG. 3 provides an exploded view of the electronic control assembly of FIG. 2.
Figure 4:
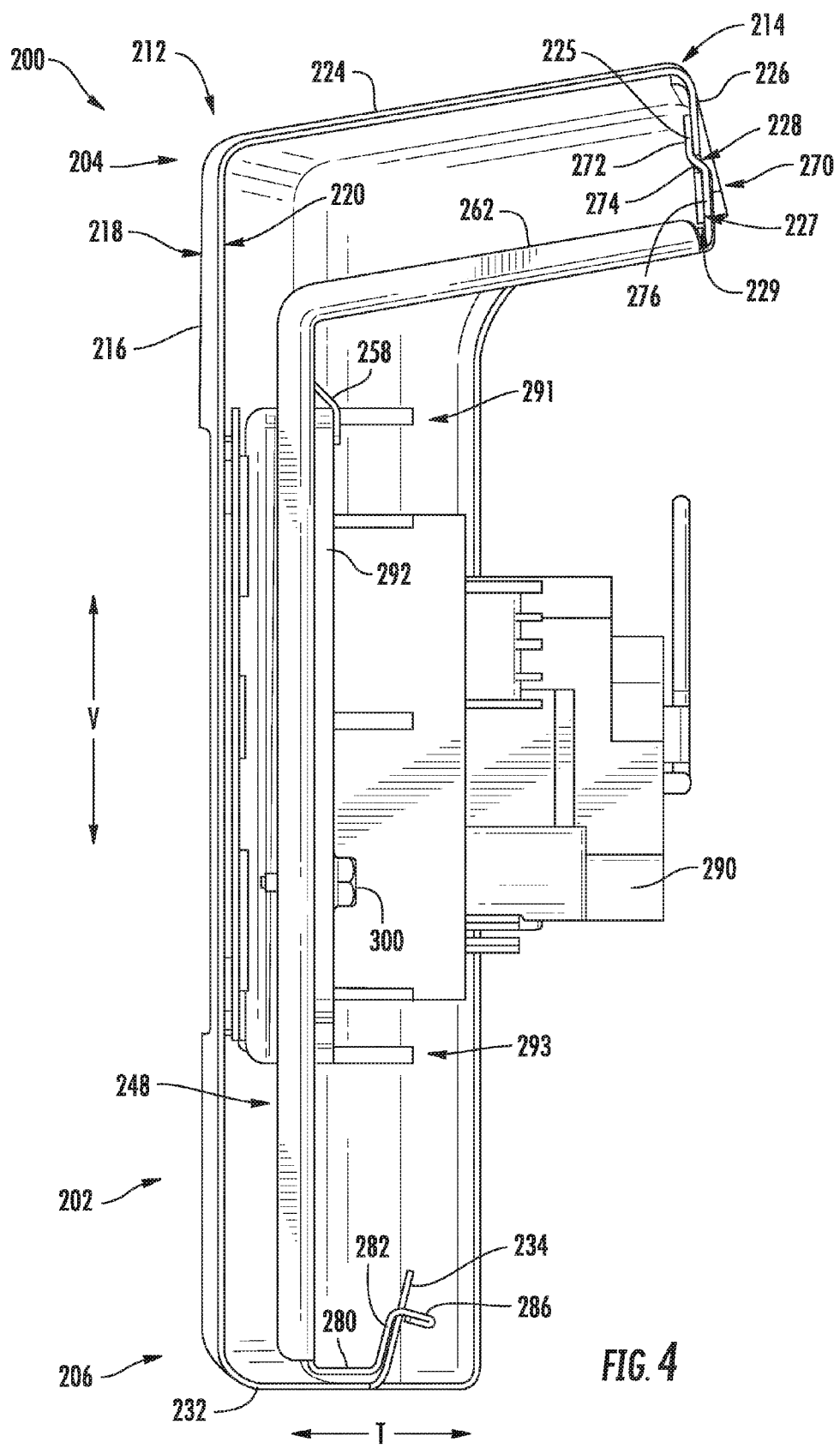
FIG. 4 provides a side, cross-sectional view of the electronic control assembly of FIG. 2.

FIG. 2 provides a rear perspective view of an exemplary electronic control assembly 200 in a fully assembled configuration according to an exemplary embodiment of the present disclosure. FIG. 3 provides an exploded view of electronic control assembly 200 of FIG. 2. FIG. 4 provides a cross sectional view of electronic control assembly 200 of FIG. 2. As shown, electronic control assembly 200 includes control panel 202. Control panel 202 extends between a top portion 204 and a bottom portion 206 along the vertical direction V, between a first end 208 and a second end 210 along the lateral direction L, and between a front portion 212 and a rear portion 214 along the transverse direction T (FIG. 4). Control panel 202 includes a main panel 216 that extends generally in a plane along the vertical direction V and lateral direction L. Main panel 216 includes a front side 218 and a rear side 220 (FIG. 4). Main panel 216 defines a panel opening 222 (FIG. 3).

A top wall 224 projects generally rearward along the transverse direction T from top portion 204 of main panel 216. A top flange 226 projects from a rear portion of top wall 224 in a plane generally parallel to the vertical direction V and the lateral direction L. More specifically, top flange 226 projects in a generally downward direction along the vertical direction V and extends in the lateral direction L along the lateral length of control panel 202. Top flange 226 defines one or more slots. For this embodiment, top flange 226 defines a first slot 228 and a second slot 230 (FIG. 2). The first and second slots 228, 230 both extend along the lateral direction L. However, in some embodiments, first and second slots 228, 230 can extend in other directions, such as e.g., along the vertical direction V or partially along the vertical direction V and partially along the lateral direction L.

Figure 5:
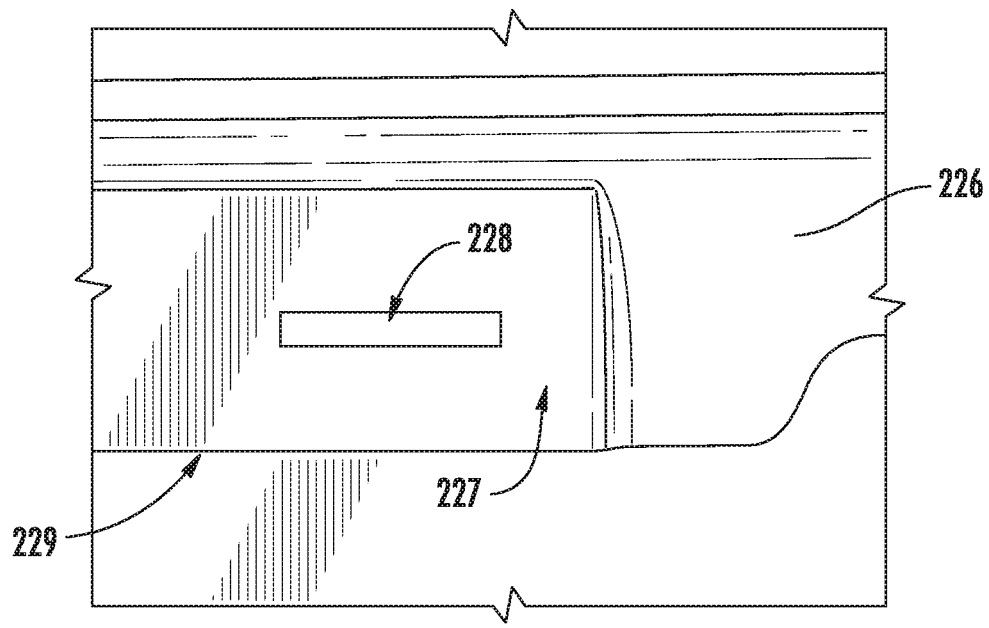
FIG. 5 provides a close-up view of Section A of FIG. 3 illustrating an exemplary slot defined by a control panel of the electronic control assembly of FIG. 3.

FIG. 5 provides a close-up view of Section A of FIG. 3 illustrating first slot 228 defined by control panel 202. First slot 228 is shown defined by top flange 226 in a generally rectangular configuration. Other suitable configurations are also possible, as noted above. First slot 228 is configured to receive a tab of one of the brackets of electronic control assembly 200 as will be described herein. Moreover, as shown, top flange 226 includes a pivot edge 229, which in this embodiment is the edge of the vertically oriented top flange 226.

Returning to FIGS. 2 through 4, a bottom wall 232 projects from bottom portion 206 of main panel 216 generally rearward along the transverse direction T. A bottom flange 234 projects from a rear portion of bottom wall 232 in a plane generally parallel with the vertical direction V and the lateral direction L. In particular, bottom flange 234 projects in a generally upward direction along the vertical direction V and extends generally along the lateral direction L along the lateral length of control panel 202. Bottom flange 234 defines one or more bottom flange openings. For this embodiment, bottom flange 234 defines a first bottom flange opening 236 and a second bottom flange opening 238. First and second bottom flange openings 236, 238 generally define voids in bottom flange 234 in which a bracket may be inserted as will be described herein.

Moreover, for this embodiment, bottom flange 234 defines one or more step cutouts, or step-shaped voids in bottom flange 234. As shown, bottom flange 234 defines a first step cutout 240 and a second step cutout 242. First step cutout 240 is defined by bottom flange 234 proximate first bottom flange opening 236 and second step cutout 242 is defined by bottom flange 234 proximate second bottom flange opening 238. For this embodiment, first step cutout 240 is positioned directly laterally inward, denoted by arrow 244, of first bottom flange opening 236 and second step cutout 242 is positioned directly laterally inward, also denoted by 244, of second bottom flange opening 238. As used herein, laterally inward 244 is a direction along the lateral direction L toward a lateral centerline 246 of control panel 202. As the first and second step cutouts 240, 242 are defined directly proximate their respective first and second bottom flange openings 236, 238, the first and second step cutouts 240, 242 form a contiguous opening with their respective first and second bottom flange openings 236, 238 as shown. Moreover, as shown in FIGS. 2 and 3, first step cutout 240 is vertically aligned with first slot 228 of top flange 226 and second step cutout 242 is vertically aligned with second slot 230 of top flange 226. In this way, when the brackets of electronic control assembly 200 are slid laterally inward 244, the brackets are oriented substantially along the vertical direction V. This ensures that the brackets are properly aligned to receive a control board for mounting and provides an operator with a quick guide or reference in confirming proper assembly of the brackets.

Figure 6:
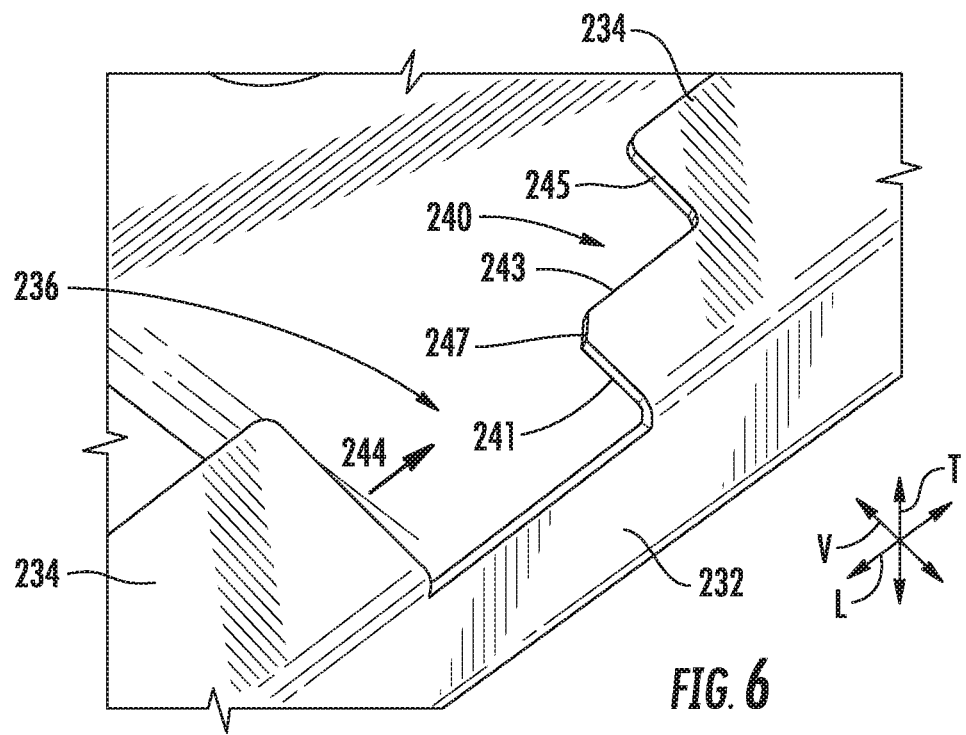
FIG. 6 provides a close-up view of Section B of FIG. 3 illustrating an exemplary bottom flange opening and step cutout defined by the bottom flange of the control panel of FIG. 3.

FIG. 6 provides a close-up view of Section B of FIG. 3 illustrating first step cutout 240 of bottom flange 234. As shown, first step cutout 240 creates a step-like shape in bottom flange 234. More specifically, first step cutout 240 defines a void in bottom flange 234 such that the resulting shape of bottom flange 234 has a first rise edge 241 that extends generally along the vertical direction V, a run or tread edge 243 that extends from first rise edge 241 generally along the lateral direction L, and a second rise edge 245 that extends from tread edge 243 generally along the vertical direction V. A chamfered edge 247 transitions first rise edge 241 to tread edge 243 to allow a bracket to be more easily slid laterally inward 244 into first step cutout 240. When a bracket is slid into first step cutout 240, tread edge 243 acts as a mating surface for the bracket and second rise edge 245 acts as a lateral stop. In this way, second rise edge 245 assists with vertical alignment of the bracket. It will be appreciated that second step cutout 242 can be arranged and configured in the same or similar manner as first step cutout 240 except that the orientation of second step cutout is flipped in the lateral direction L as shown in FIG. 3.

Returning to FIGS. 2 through 4, electronic control assembly 200 includes one or more brackets. For this embodiment, electronic control assembly 200 includes a first bracket 248 and a second bracket 250. The first and second brackets 248, 250 are positioned at rear side 220 of main panel 216 and are positioned on opposite sides of panel opening 222. In particular, first bracket 248 is positioned on the side of panel opening 222 closest to first end 208 and second bracket 250 is positioned on the side of panel opening 222 closest to second end 210. First and second brackets 248, 250 structurally support electronic control assembly 200. First and second brackets 248, 250 can be made of any suitable material. For this embodiment, first and second brackets 248, 250 are made of galvanized steel. However, first and second brackets 248, 250 can be made of any suitable material.

FIG. 7 provides a side view of first bracket 248 and FIG. 8 provides a perspective view thereof according to an exemplary embodiment of the present disclosure. It will be appreciated that second bracket 250 can be arranged and configured in the same or similar manner as first bracket 248 of FIGS. 7 and 8. As shown, first bracket 248 includes a body 252 that extends along the vertical direction V between a top 254 and a bottom 256. Body 252 includes a body tab 258 oriented along the vertical direction V. For this embodiment, body tab 258 is oriented to receive objects that are slid vertically upward toward top 254. Body tab 258 is ramped as shown to provide for a more secure engagement of objects inserted upward into body tab 258. In particular, body tab 258 includes a ramped portion 261 and a vertical portion 263. Ramped portion 261 is shown extending in an inclined plane approximately forty-five degrees (45°) with respect to the vertical direction V (FIG. 7). Vertical portion 263 extends generally downward in the vertical direction V from ramped portion 261. Ramped portion 261 spaces vertical portion 263 apart from body 252 along the transverse direction T such that objects can be inserted upward into body tab 258. When an object is inserted vertically upward into body tab 258, body tab 258 and body 252 act to wedge the object therebetween. Ramped portion 261 provides a mechanical advantage to increase the force body tab 258 exerts on the inserted object to press the object against body 252. In this way, body tab 258 secures the inserted object and provides a tight fit. It will be appreciated that body tab 258 may have other suitable configurations. For example, ramped portion 261 may be oriented at a sharper angle to increase the mechanical advantage of body tab 258. As another example, body tab 258 can be oriented to receive objects that are slid vertically downward toward bottom 256. In yet another example, body tab 258 can be oriented to receive objects in either or both the lateral and vertical directions L, V. In such an embodiment, body tab 258 can be configured in an L-shape, for example. In addition, body 252 also defines one or more openings 259 for receiving one or more fasteners.

First bracket 248 includes a top arm 260 extending from top 254 of body 252. In particular, top arm 260 extends from top 254 of body 252 generally rearward along transverse direction T. Top arm 260 includes a first side edge 262 and a second side edge 264 each extending along top arm 260 in a plane parallel to the vertical direction and transverse directions V, T. First and second side edges 262, 264 are oriented substantially parallel to one another and are spaced apart along the lateral direction L by a top arm wall 266 that extends in a plane generally along the transverse and lateral directions T, L. Additionally, as shown in FIGS. 7 and 8, first side edge 262 and second side edge 264 extend along top arm 260 and then transition and extend along body 252.

Top arm 260 also includes a tab 268 that is insertable into one of the slots (i.e., first or second slots 228, 230) of top flange 226 for securing top arm 260 to control panel 202. Tab 268 extends from top arm wall 266 generally in the vertical direction V. For this embodiment, tab 268 is an S-tab 270. S-tab 270 includes a top portion 272, a transition portion 274, and a bottom portion 276.

As shown in FIG. 4, S-tab 270 of first bracket 248 is inserted through first slot 228. When inserted, top portion 272 of S-tab 270 engages a front surface 225 of top flange 226, transition portion 274 extends through first slot 228, and bottom portion 276 of S-tab 270 engages a rear surface 227 of top flange 226. The engagement of these noted surfaces secures top arm 260 of first bracket 248 with control panel 202. It will be appreciated that second bracket 250 can be inserted through second slot 230 and secured to top flange 226 of control panel 202 in a similar fashion as first bracket 248.

Returning to FIGS. 7 and 8, first bracket 248 also includes a bottom arm 278 extending from bottom 256 of body 252. In particular, bottom arm 278 extends from bottom 256 of body 252 generally rearward along the transverse direction T. For this embodiment, bottom arm 278 includes a transverse portion 280 that is connected to body 252 and extends in the transverse direction T as shown. Extending from transverse portion 280 is a vertical portion 282 that extends generally in the vertical direction V, and more particularly, vertical portion 282 extends upward along the vertical direction V for this embodiment. Extending from vertical portion 282 is a securing mechanism 284. For this embodiment, securing mechanism 284 is a hem flange 286. Hem flange 286 can be any suitable type of hem flange, including a flattened hem (as shown), an open hem, a tear drop hem, a rope hem, a curl hem, etc. In some exemplary embodiments, securing mechanism 284 can be other suitable types of flanges as well, including an open flange, an open curl flange, a tear drop flange, a tear drop curl flange, a curl flange, etc. When first bracket 248 and second bracket 250 are inserted into their respective first and second bottom flange openings 236, 238 and then slid laterally inward 244, the hem flanges 286 of the first and second brackets 248, 250 mate with their respective first and second step cutouts 240, 242 thereby locking first and second bracket 248, 250 in locking engagement with bottom flange 234. By way of example, as shown in FIG. 4, hem flange 286 of first bracket 248 is shown locking first bracket 248 in place with bottom flange 234 of control panel 202.

Returning to FIGS. 2 through 4, electronic control assembly 200 includes an electronic control unit or control board 290. Control board 290 extends along the vertical direction V between a top portion 291 and a bottom portion 293 and along the lateral direction L between a first end 295 and a second end 297. Control board 290 includes a processing unit or controller for controlling operation of range appliance 100. Controller of control board 290 is communicatively coupled with various components of range appliance 100. For example, the controller of control board 290 can be communicatively coupled with one or more user inputs 142 (FIG. 1) of range appliance 100 for user manipulation of the operation of range appliance 100 such as e.g., selection of one or more cooking settings, among other options. The controller of control board 290 can be communicatively coupled with user inputs 142 via one or more wired or wireless signal lines, shared communication busses, control switches, etc. Input/output ("I/O") signals may be routed between the controller and various operational components of range appliance 100, such as e.g., one or more heating elements of range appliance 100. In response to user manipulation of one of the user inputs 142, the controller of control board 290 operates various components of range appliance 100. The controller of control board 290 can be any suitable type of controller capable of regulating and controlling operations of range appliance 100.

Controller of control board 290 can include a memory and one or more microprocessors, CPUs or the like, such as general or special purpose microprocessors operable to execute programming instructions or micro-control code associated with operation of range appliance 100. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Referring still to FIGS. 2 through 4, a first flange 292 is shown connected to or integral with control board 290. When electronic control assembly 200 is assembled, first flange 292 overlays first bracket 248 as shown in FIG. 2. First flange 292 defines one or more first openings 294 that are aligned along the vertical direction V. At least one of the first openings 294 is configured to receive a fastener (e.g., screws) such that control board 290 can be mounted to first bracket 248 at its first end 295. Likewise, a second flange 296 is shown connected to or integral with control board 290. When electronic control assembly 200 is assembled, second flange 296 overlays second bracket 250 as shown in FIG. 2. Second flange 296 defines one or more second openings 298 that are aligned along the vertical direction V. At least one of the second openings 298 is configured to receive a fastener (e.g., screws) such that control board 290 can be mounted to second bracket 250 at its second end 297.

Electronic control assembly 200 also includes one or more fasteners. For this embodiment, electronic control assembly 200 includes two fasteners, a first fastener 300 and a second fastener 302. More particularly, first and second fasteners 300, 302 are screws for this embodiment. As shown in FIG. 3, first fastener 300 is inserted through first opening 294 of first flange 292 and through opening 259 of first bracket 248. Torque is applied to first fastener 300 to attach first flange 292 with first bracket 248. In a similar fashion, torque is applied to second fastener 302 to attach second flange 296 with second bracket 250. For this embodiment, electronic control assembly 200 requires no more than two (2) screws to fasten control board 290 to the first and second brackets 248, 250. In this way, assembly time can be reduced.

Figure 9:
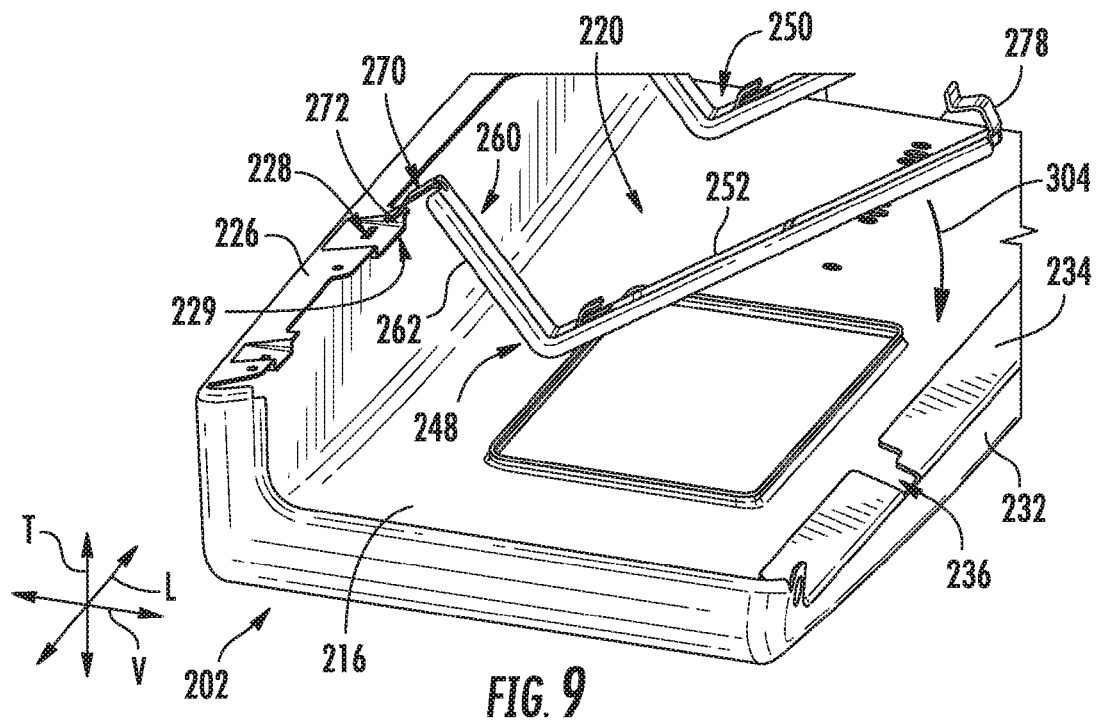
FIG. 9 provides a perspective view of exemplary brackets being inserted into their respective slots defined by an exemplary control panel according to an exemplary embodiment of the present disclosure.
Figure 11:
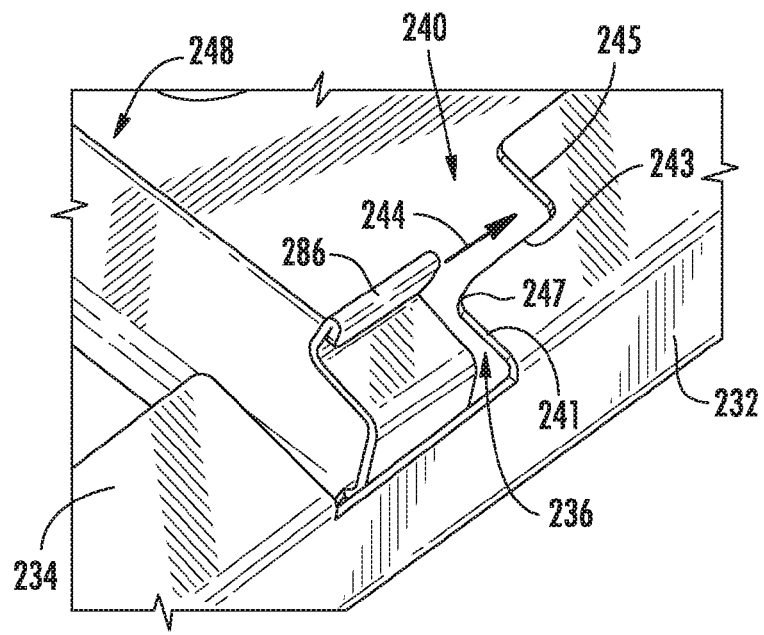
FIG. 11 provides a perspective view of one of the exemplary brackets of FIG. 9 being slid in the lateral direction.
Figure 10:
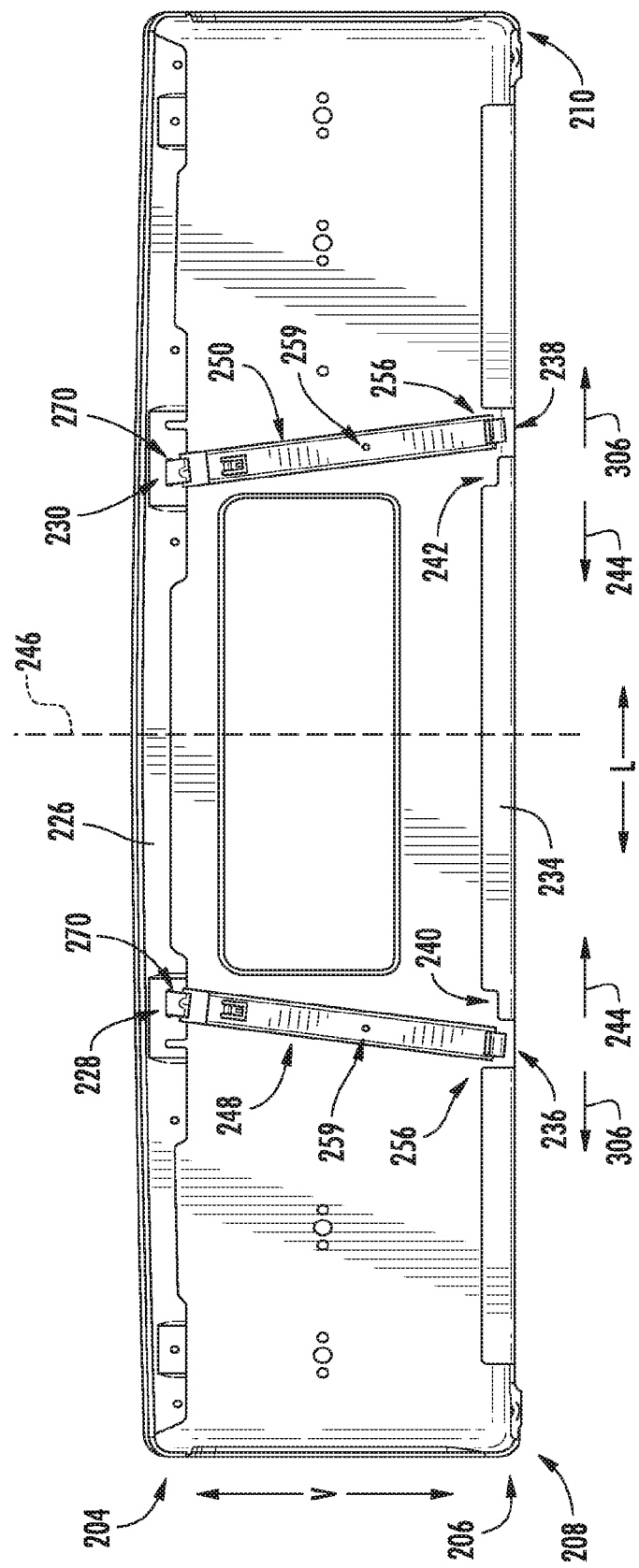
FIG. 10 provides a rear view of the brackets of FIG. 9 attached to their respective slots and being inserted into their respective bottom flange openings of the control panel of FIG. 9.

Referring now to FIGS. 9 through 13, the manner in which electronic control assembly 200 is assembled will be further described. FIG. 9 provides a perspective view of exemplary first and second brackets 248, 250 being inserted into their respective first and second slots 228, 230. FIG. 10 provides a rear view of first and second brackets 248, 250 inserted into their respective first and second slots 228, 230 and being inserted into their respective first and second bottom flange openings 236, 238. FIG. 11 provides a perspective view of first bracket 248 being slid into locking engagement with bottom flange 234. FIG. 12 provides a perspective view of control board 290 being attached at its top portion 291 to first bracket 248. FIG. 13 provides a rear view of control board 290 attached to control panel 202 according to an exemplary embodiment of the present disclosure.

As shown in FIG. 9, first bracket 248 is positioned to be inserted into first slot 228. In particular, for this embodiment, S-tab 270 of first bracket 248 is positioned to be inserted into first slot 228. Although not shown, second bracket 250 is also positioned to be inserted into second slot 230. In particular, S-tab 270 of second bracket 250 is positioned to be inserted into second slot 230 in a similar manner as described for first bracket 248.

To locate S-tab 270 of first bracket 248 into first slot 228, first bracket 248 is angled as shown in FIG. 9 so that top portion 272 of S-tab 270 can be inserted into first slot 228. After top portion 272 of S-tab 270 is inserted into first slot 228, top portion 272 is pushed or guided vertically upward toward top portion 204 of control panel 202. To guide top portion 272 further vertically upward, first bracket 248 is pivoted about the lateral direction L, denoted by arrow 304. To provide for a smooth pivot and alignment of first bracket 248, pivot edge 229 of top flange 226 provides a pivot surface for first and second edges 262, 264 to contact as first bracket 248 is pivoted about the lateral direction L. In this way, first and second edges 262, 264 of top arm 260 allow for top portion 272 of S-tab 270 to ease into first slot 228. S-tab 270 of second bracket 250 can be inserted into second slot 230 and secured to top flange 226 in the same or similar fashion as first bracket 248.

With reference to FIG. 4, as noted previously, when S-tab 270 of first bracket 248 is fully inserted into first slot 228, top portion 272 of S-tab 270 engages rear surface 225 of top flange 226, transition portion 274 extends through first slot 228, and bottom portion 276 of S-tab 270 engages rear surface 227 of top flange 226. The engagement of these surfaces secures top arm 260 of first bracket 248 with control panel 202. And in a similar fashion, the engagement of these surfaces secures top arm 260 of second bracket 250 with control panel 202.

As shown in FIG. 10, S-tab 270 of first bracket 248 and S-tab 270 of second bracket 250 are inserted into their respective first and second slots 228, 230. For this embodiment, first slot 228 and second slot 230 are defined by top flange 226 such that they allow for first bracket 248 and second bracket 250 to be angled with respect to the vertical direction V as shown in FIG. 10. Stated alternatively, first slot 228 is defined with sufficient vertical and lateral clearance such that first slot 228 allows for bottom 256 of first bracket 248 to be angled laterally outward along the lateral direction L, denoted by arrow 306; and in a similar fashion, second slot 230 is defined with sufficient vertical and lateral clearance such that second slot 230 allows for bottom 256 of second bracket 250 to be angled laterally outward 306 along the lateral direction L. In this way, first and second brackets 248, 250 can be inserted into their respective first and second bottom flange openings 236, 238 as shown in FIG. 10.

As shown in FIG. 11, once bottom 256 of first bracket 248 is inserted into first bottom flange opening 236, first bracket 248 is slid laterally inward 244 such that hem flange 286 locks first bracket 248 into locking engagement with bottom flange 234. More specifically, hem flange 286 mates with the tread edge 243 of first step cutout 240 to secure first bracket 248 with bottom flange 234 and is stopped laterally by second rise edge 245. Moreover, second rise edge 245 ensures that first bracket 248 is vertically aligned with first slot 228. In addition, chamfered edges 247 of first and second step cutouts 240, 242 further provide for smooth lateral movement of first and second brackets 248, 250 into their respective first and second step cutouts 240, 242. FIG. 4 depicts hem flange 286 in locking engagement with first step cutout 240. As will be appreciated, second bracket 250 can be secured to bottom flange 234 in the same or similar fashion as first bracket 248. The lateral sliding installation of first and second brackets 248, 250 provides for ergonomic assembly of first and second brackets 248, 250 to control panel 202.

As shown in FIG. 12, once first and second brackets 248, 250 are secured to control panel 202, control board 290 can be attached to first and second brackets 248, 250. As shown, first flange 292 of control board 290 is inserted vertically upward toward top portion 204 of control panel 202 into body tab 258 of first bracket 248. In a similar fashion, although not shown in FIG. 12, second flange 296 of control board 290 is inserted vertically upward toward top portion 204 of control panel 202 into body tab 258 of second bracket 250. In this way, body tabs 258 of first and second brackets 248, 250 secure top portion 291 of control board 290 into place. For this embodiment, body tabs 258 secure top portion 291 of control board 290 into place without screws.

In some embodiments, when control board 290 is inserted into body tabs 258 and then laid flat such that first and second flanges 292, 296 of control board 290 overlay their respective first and second brackets 248, 250, openings 259 of first and second brackets 248, 250 can be positioned along the vertical direction V such that if the control board 290 is inserted upside down, openings 259 are not in communication with first and second openings 294, 298. Stated alternatively, if control board 290 is inserted into body tabs 258 with the correct orientation, openings 259 and first and second openings 294, 298 can be configured to align, and if control board 290 is not inserted correctly (i.e., upside down), openings 259 and first and second openings 294, 298 do not align. In this way, it is ensured that control board 290 is oriented correctly.

As shown in FIG. 13, first flange 292 of control board 290 is inserted into body tab 258 of first bracket 248 and second flange 296 of control board 290 is inserted into body tab 258 of second bracket 250 to secure control board 290 to the first and second brackets 248, 250. In this way, top portion 291 of control board 290 is secured to first and second brackets 248, 250 as noted above. To secure bottom portion 293 of control board 290, as shown with respect to FIGS. 3 and 13, first fastener 300 is inserted through one of first openings 294 and through opening 259 of first bracket 248 to secure control board 290 at its first end 295 and second fastener 302 is inserted through one of second openings 298 and through opening 259 of second bracket 250 to secure control board 290 at its second end 297. Once control board 290 is secured at its top portion 291 (i.e., by being inserted into body tabs 258 of first and second brackets 248, 250) and bottom portion 293 (i.e., by being secured by first and second fasteners 300, 302) to first and second brackets 248, 250 as well as at its first and second ends 295, 297, control board 290 acts as a linking member between first and second brackets 248, 250 to further lock first bracket 248 and second bracket 250 in place such that they do not slide laterally when a user of range appliance 100 exerts a force on control panel 202 or control board 290 (i.e., by manipulating one of user inputs 142). In this way, electronic control assembly 200 may provide a sturdy fit and feel.

Figure 17:
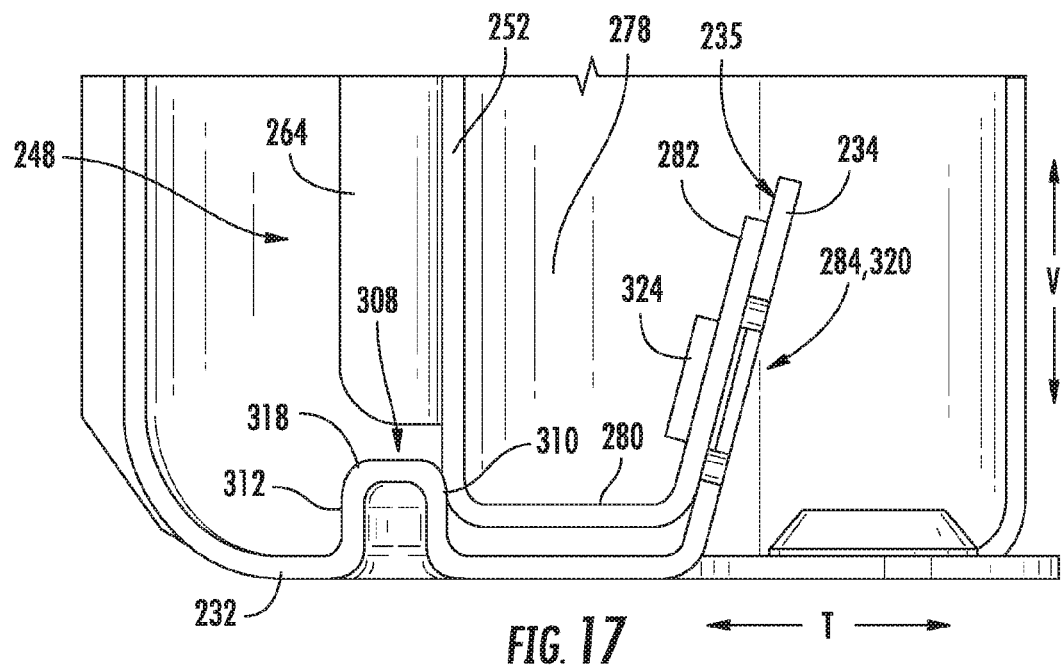
FIG. 17 provides a side cross-sectional view of the bracket of FIG. 14 inserted into the control panel of FIGS. 15 and 16.
Figure 18:
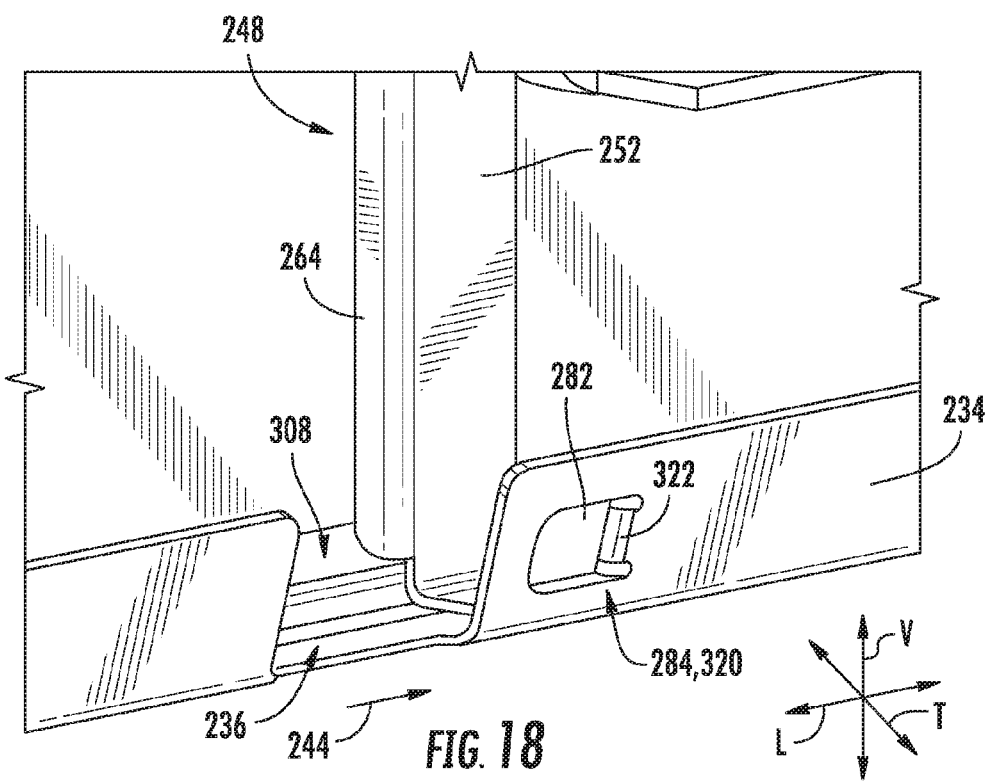
FIG. 18 provides a perspective view of the bracket and control panel of FIG. 17.

Referring now to FIGS. 14 through 18, another exemplary embodiment of electronic control assembly 200 will be described. Electronic control assembly 200 of FIGS. 14 through 18 is configured in the same manner as that of electronic control assembly 200 depicted and described above with the exception of the noted differences. FIG. 14 provides a perspective view of first bracket 248; FIG. 15 provides a close up view of control panel 202; FIG. 16 provides a bottom perspective view of control panel 202 of FIG. 15; FIG. 17 provides a side cross-sectional view of first bracket 248 in locking engagement with securing mechanism 284 of bottom flange 234 of control panel 202; and FIG. 18 provides a perspective view thereof according to an exemplary embodiment of the present disclosure.

As shown in FIG. 14, for this embodiment, first bracket 248 has the same configuration of first and second brackets 248, 250 depicted and described above except that bottom arm 278 has a different configuration. In particular, for first bracket 248 of FIG. 14, bottom arm 278 includes transverse portion 280 and vertical portion 282. However, bottom arm 278 does not include a securing mechanism 284, such as a hem flange 286. It will be appreciated that second bracket 250 can be configured in the same manner as that of first bracket 248 depicted and described in FIG. 14.

As shown in FIG. 15, bottom wall 232 of control panel 202 defines an emboss 308 protruding therefrom in the vertical direction V toward top portion 204 of control panel 202. For this embodiment, emboss 308 is configured generally in an oval shape. However, other configurations are possible, such as e.g., a rectangular shape. Emboss 308 extends along the transverse direction T between a front wall 310 and rear wall 312 (FIG. 17) and between a first end 314 and a second end 316 along the lateral direction L. A top wall 318 connects the front and rear walls 310, 312 and extends in a plane parallel to the lateral and transverse directions L, T in a generally oval shape as noted above.

As further shown in FIG. 15, emboss 308 extends along the lateral direction L the lateral length of first bottom flange opening 236 such that when first bracket 248 is inserted into first bottom flange opening 236, first bracket 248 is constrained by emboss 308 along the transverse direction T. In this manner, an operator can consistently insert first bracket 248 into first bottom flange opening 236 the proper distance along the transverse direction T. Moreover, as shown, emboss 308 continues to extend along the lateral direction L the lateral length of securing mechanism 284 included on bottom flange 234 proximate first bottom flange opening 236. In this way, when first bracket 248 is inserted into first bottom opening 236 and then slid laterally inward 244 such that bottom arm 278 of first bracket 248 is secured in locking engagement with securing mechanism 284, emboss 308 constrains movement of first bracket 248 along the transverse direction T. This ensures that bottom arm 278 of first bracket 248 is consistently received by securing mechanism 284 when first bracket 248 is slid laterally inward 244.

As shown in FIG. 16, for this embodiment, bottom flange 234 includes securing mechanism 284. In particular, for this embodiment, securing mechanism 284 is a laterally oriented tab 320. Tab 320 includes a ramped portion 322 and a lateral portion 324. Tab 320 is configured to receive vertical portion 282 of bottom arm 278 of first bracket 248 when first bracket 248 is slid laterally inward 244 into locking engagement with tab 320 (FIGS. 17 and 18). In a similar fashion to ramped portion 261 of body tab 258, the incline of ramped portion 322 of tab 320 provides a mechanical advantage when an object (e.g. a bracket) is slid into tab 320.

As shown in FIGS. 17 and 18, when first bracket 248 is slid into locking engagement with securing mechanism 284, or in this embodiment laterally oriented tab 320, vertical portion 282 of bottom arm 278 is slid between lateral portion 324 of tab 320 and bottom flange 234. Specifically, lateral portion 324 and ramped portion 322 of tab 320 press vertical portion 282 of bottom arm 278 against a front surface 235 of bottom flange 234 to secure first bracket 248 to bottom flange 234. Tab 320 acts as an anchor to secure first bracket 248 to bottom flange 234. In addition, tab 320 acts as a lateral stop such that first bracket 248 is not slid laterally inward 244 too far. Tab 320 also assists an operator with vertically aligning first bracket 248 in position. In this manner, first opening 294 of first flange 292 of control board 290 can be aligned with opening 259 of first bracket 248 so that first fastener 300 can secure the control board 290 to first bracket 248. Moreover, emboss 308 is shown in FIG. 17 constraining first bracket 248 in place along the transverse direction T. Specifically, body 252 of first bracket 248 is shown contacting front wall 310 of emboss 308 to constrain first bracket 248 in the transverse direction T. It will be appreciated that second bracket 250 can be secured and constrained in the same or similar manner as first bracket 248.

Referring now to FIGS. 19 and 20, FIG. 19 provides a perspective view of an exemplary bracket and FIG. 20 provides a perspective view of the bracket of FIG. 19 secured by its securing mechanism 284 to bottom flange 234 of an exemplary control panel 202 according to an exemplary embodiment of the present disclosure.

As shown in FIG. 19, exemplary bracket is shown as first bracket 248. Top arm 260 of first bracket 248 includes tab 268. For this embodiment, tab 268 is a C-tab 326. C-tab 326 includes a first vertical portion 328 extending from top arm wall 266. First vertical portion 328 extends generally upward along the vertical direction V and is oriented in a plane parallel to the vertical direction V and the lateral direction L. At the top end of first vertical portion 328, C-tab 326 transitions to a curved portion 330. Curved portion 330 transitions first vertical portion 328 to a second vertical portion 332. As shown, second vertical portion 332 extends generally downward along the vertical direction V and is oriented in a plane parallel to the vertical direction V and the lateral direction L. In this manner, first vertical portion 328 and second vertical portion 332 are spaced apart along the transverse direction T. Although not shown, when first bracket 248 of FIGS. 19 and 20 is inserted into first slot 228, first vertical portion 328 may contact front surface 225 of top flange 226, curved portion 330 contacts top flange 226 at the bottom edge of first slot 228, and second vertical portion 332 may contact rear surface 227 of top flange 226 to secure top arm 260 of first bracket 248 to top flange 226. It will be appreciated that second bracket 250 can be secured in the same or similar manner as first bracket 248.

As further shown in FIG. 19, bottom arm 278 of first bracket 248 includes transverse portion 280 extending from body 252 of first bracket 248 generally along the transverse direction T. Transverse portion 280 then transitions to vertical portion 282, which extends generally in the vertical direction V from transverse portion 280. Vertical portion 282 of bottom arm 278 extends along the lateral direction L between a first end 334 and a second end 336. At first end 334, first bracket 248 includes securing mechanism 284. And more particularly, for this embodiment, securing mechanism 284 is a curl flange 338.

As shown in FIGS. 19 and 20, curl flange 338 is laterally oriented such that when first bracket 248 is slid laterally inward 244, curl flange 338 receives the transverse thickness of bottom flange 234. That is, bottom flange 234 is received between vertical portion 282 and curl flange 338 of bottom arm 278 when first bracket 248 is slid into locking engagement with bottom flange 234. Moreover, as shown in FIG. 20, bottom flange 234 of control panel 202 does not include securing mechanism 284; when first bracket 248 is slid laterally inward 244, curl flange 338 secures bottom arm 278 to bottom flange 234. It will be appreciated that second bracket 250 can be secured in the same or similar manner as first bracket 248.

As further shown in FIG. 19, body 252 of first bracket 248 includes body tab 258 oriented along the vertical direction V. For this embodiment, body tab 258 is oriented to receive objects that are slid vertically downward toward bottom 256. Body tab 258 is ramped as shown to provide for a more secure engagement of objects inserted downward into body tab 258. In particular, body tab 258 includes a ramped portion 340 and vertical portion 342. Ramped portion 340 is shown extending in an inclined plane approximately forty-five degrees (45°) with respect to the vertical direction V. Vertical portion 342 extends generally upward in the vertical direction V from ramped portion 340. Ramped portion 340 spaces vertical portion 342 apart from body 252 along the transverse direction T such that objects (e.g. first or second flange 292, 296 of control board 290) can be inserted downward into body tab 258. When an object is inserted vertically downward into body tab 258, body tab 258 and body 252 act to wedge the object therebetween. Ramped portion 340 provides a mechanical advantage to increase the force body tab 258 exerts on the inserted object to press the object against body 252. In this way, body tab 258 secures the inserted object and provides a tight fit. It will be appreciated that body tab 258 may have other suitable configurations.

Figure 22:
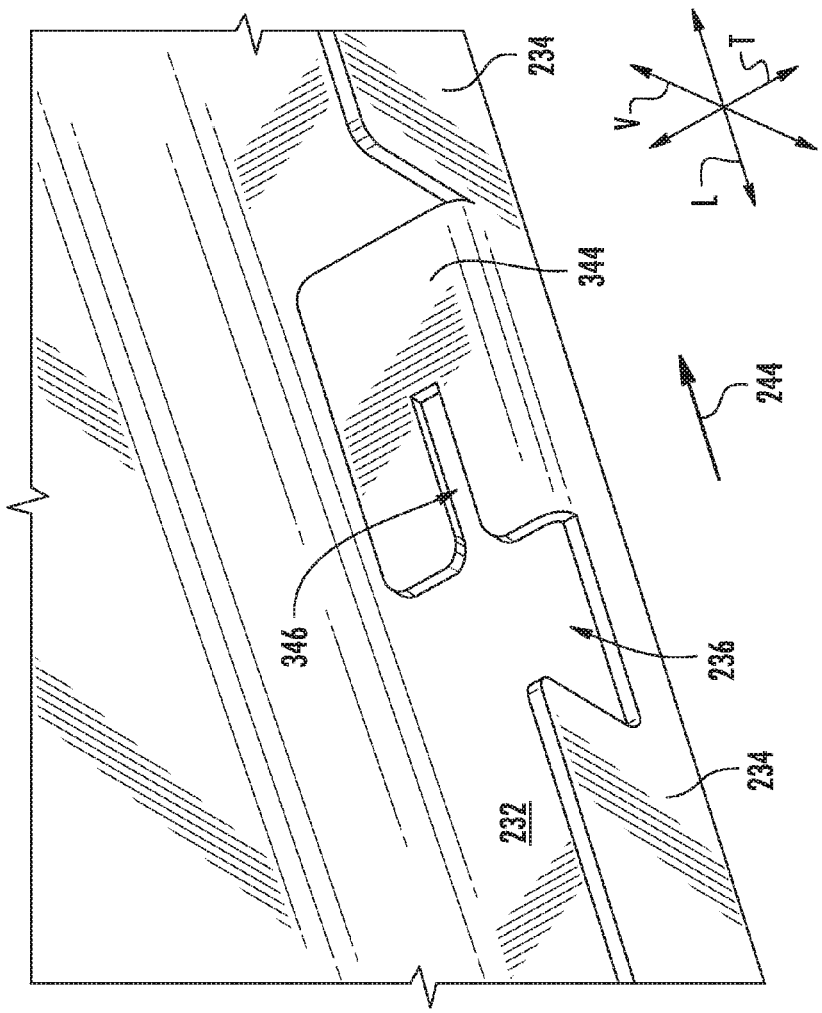
FIG. 22 provides a perspective view of an exemplary bottom flange of an exemplary control panel according to an exemplary embodiment of the present disclosure.
Figure 21:
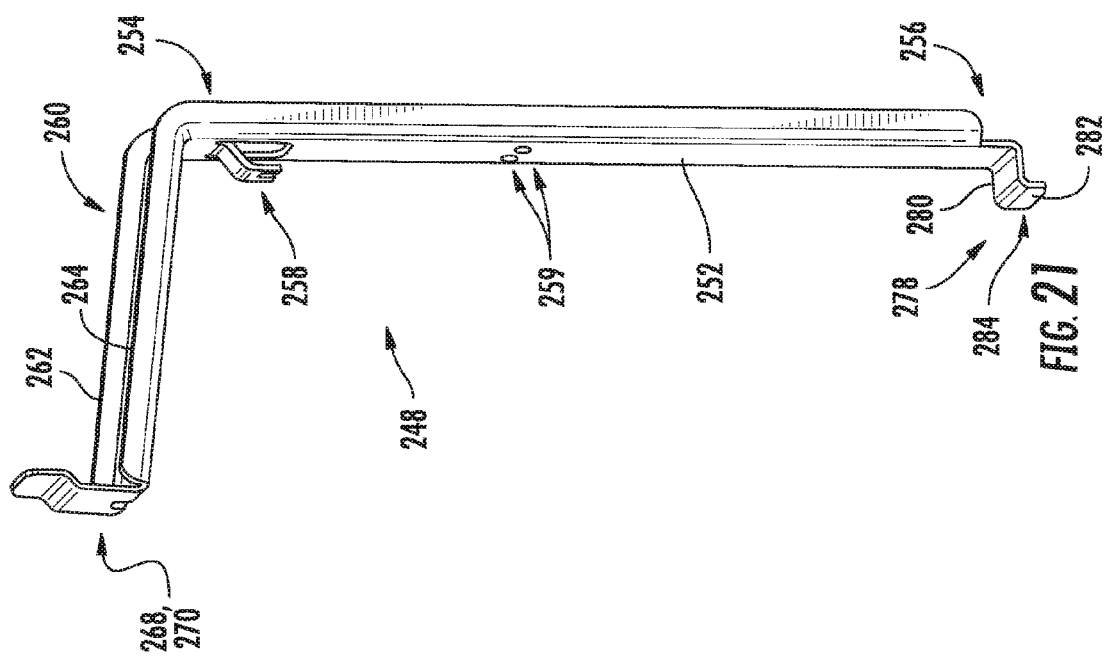
FIG. 21 provides a perspective view of an exemplary bracket according to an exemplary embodiment of the present disclosure.
Figure 23:
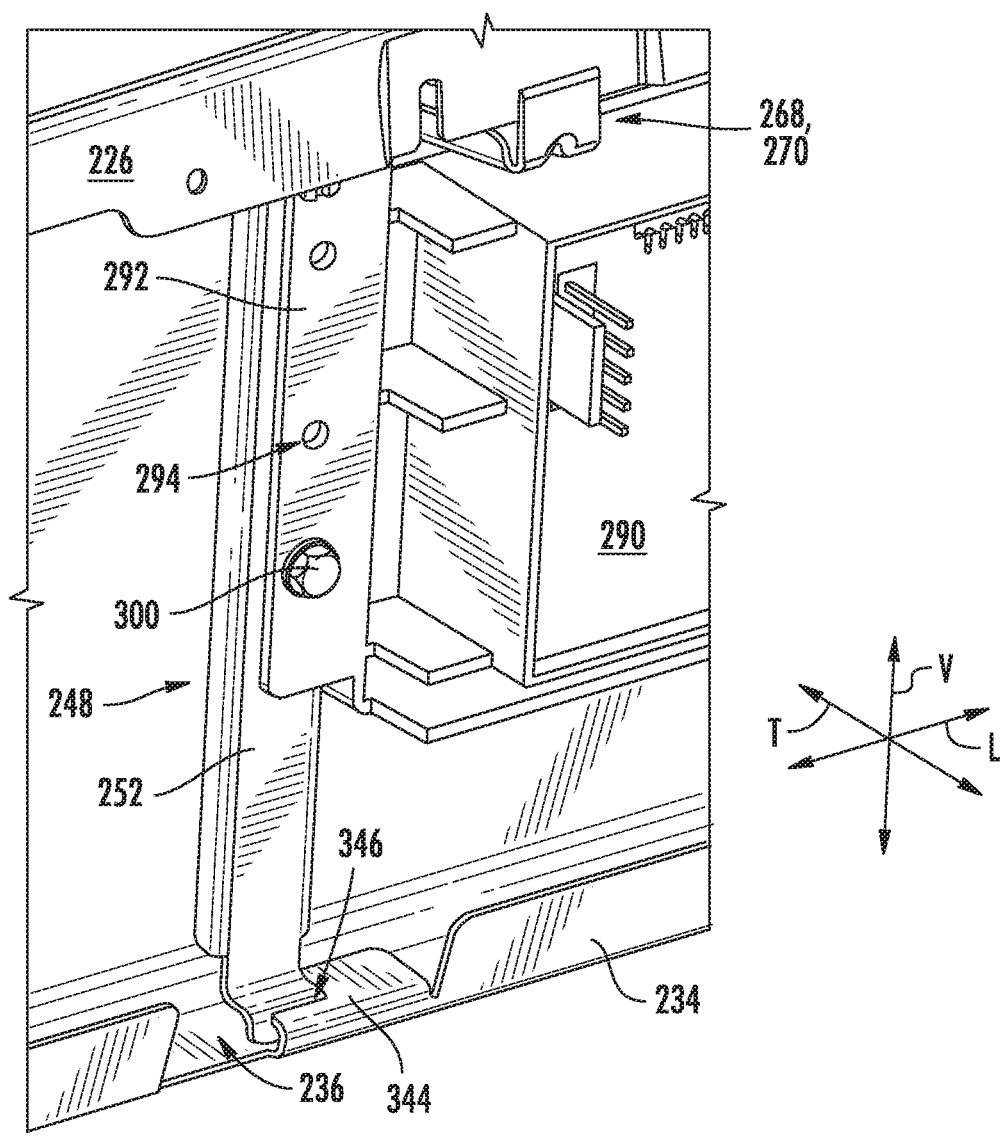
FIG. 23 provides a perspective view of the bracket of FIG. 21 secured to exemplary control panel of FIG. 22 according to an exemplary embodiment of the present disclosure.

Referring now to FIGS. 21 through 23, FIG. 21 provides a perspective view of an exemplary bracket; FIG. 22 provides a perspective view of exemplary bottom flange 234 of exemplary control panel 202; and FIG. 23 provides a perspective view of the bracket of FIG. 21 secured to exemplary control panel 202 of FIG. 22 according to an exemplary embodiment of the present disclosure.

As shown in FIG. 21, for this embodiment, first bracket 248 has the same configuration of first and second brackets 248, 250 depicted and described above with respect to FIGS. 7 and 8, except that bottom arm 278 has a different configuration. In particular, for first bracket 248 of FIG. 21, bottom arm 278 includes transverse portion 280 and vertical portion 282. For this embodiment, vertical portion 282 extends downward along the vertical direction V (as opposed to upward along the vertical direction V as shown and described with reference to first bracket 248 of FIG. 14). For this embodiment, vertical portion 282 forms securing mechanism 284. It will be appreciated that second bracket 250 can be configured in the same manner as that of first bracket 248 depicted and described in FIG. 21.

As shown in FIG. 22, bottom flange 234 defines a transverse flange portion 344 positioned proximate first bottom flange opening 236. Transverse flange portion 344 extends in a plane generally along the transverse and lateral directions T, L. To form transverse flange portion 344, a portion of bottom flange 234 is folded over such that vertically extending bottom flange 234 extends generally along the transverse direction T. Then, a slit 346 can be defined in transverse flange portion 344 such that when first bracket 248 is slid laterally inward 244, downward extending vertical portion 282 of first bracket 248 is inserted within slit 346 to secure bottom arm 278 of first bracket 248 to control panel 202 as shown in FIG. 23. Slit 346 is shown constraining first bracket 248 along the transverse direction T and prevents first bracket 248 from sliding too far laterally inward 244. To secure first bracket 248 within slit 346 in the laterally outward direction (i.e., a direction opposite the laterally inward direction 244), control board 290 is secured to first bracket 248 via first fastener 300. In this way, first bracket 248 is prevented from slipping laterally outward. It will be appreciated that transverse flange portion 344 having slit 346 can also be positioned proximate second bottom flange opening 238.

In some exemplary embodiments, instead of transverse flange portion 344 including a slit 346, transverse flange portion 344 can define a step cutout configured in the same manner as first step cutout 240 of FIG. 6 except that the void in transverse flange portion 344 from the step cutout would extend in a plane parallel to the transverse and lateral directions T, L (as opposed to a plane parallel to the vertical and lateral directions V, L as that of first step cutout 240 of FIG. 6). When first bracket 248 is slid into the step cutout of transverse flange portion 344, tread edge 243 constrains vertical portion 282 of bottom arm 278 in the transverse direction T and second rise edge 245 constrains vertical portion 282 in the lateral direction L. In such embodiments, bottom wall 232 of control panel 202 can include emboss 308 to further constrain first bracket 248 in the transverse direction T. It will be appreciated that the portion of bottom flange 234 positioned proximate second bottom flange opening 238 can be configured in the same manner as that of the portion of bottom flange 234 positioned proximate first bottom flange opening 236. Stated alternatively, the portion of bottom flange 234 positioned proximate second bottom flange 238 can include an emboss, a step cutout, a transverse flange portion, etc. configured in the same manner as the portion of bottom flange 234 positioned proximate first bottom flange opening 236 described above.

Figure 24:
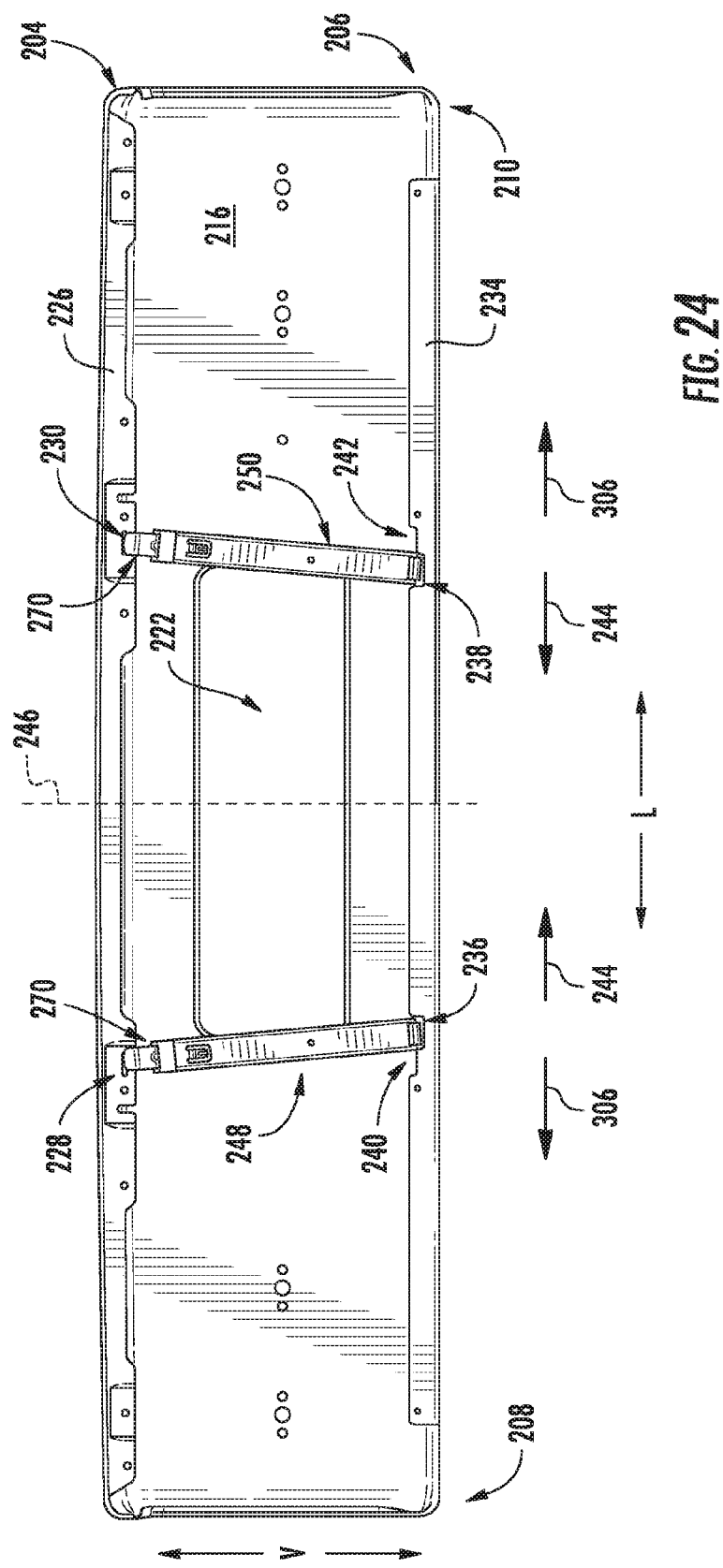
FIG. 24 provides a rear view of a pair of exemplary brackets attached to their respective slots and being inserted into their respective bottom flange openings of an exemplary control panel.

FIG. 24 provides a rear view of a pair of exemplary brackets 248, 250 attached to their respective slots 228, 230 and being inserted into their respective bottom flange openings 236, 238 of exemplary control panel 202. For this exemplary embodiment, bottom flange 234 defines first bottom flange opening 236 laterally inward of first step cutout 240 and second bottom flange opening 238 laterally inward of second step cutout 242. The first and second step cutouts 240, 242 are defined directly proximate their respective first and second bottom flange openings 236, 238, the first and second step cutouts 240, 242 form a contiguous opening with their respective first and second bottom flange openings 236, 238 as shown. For this embodiment, to secure the first and second brackets 248, 250 to bottom flange 234, the first and second brackets 248, 250 are inserted into their respective first and second bottom flange openings 236, 238 and then slid laterally outward 306 along the lateral direction L such that the first and second brackets 248, 250 are secured to their respective first and second step cutouts 240, 242. Once the first and second brackets 248, 250 are secured to the control panel 202 and the control board 290 is secured to the first and second brackets 248, 250 by fasteners 300, 302, the first and second brackets 248, 250 are further constrained from moving laterally outward 306 by bottom flange 234, as well as the control board 290.

Figure 25:
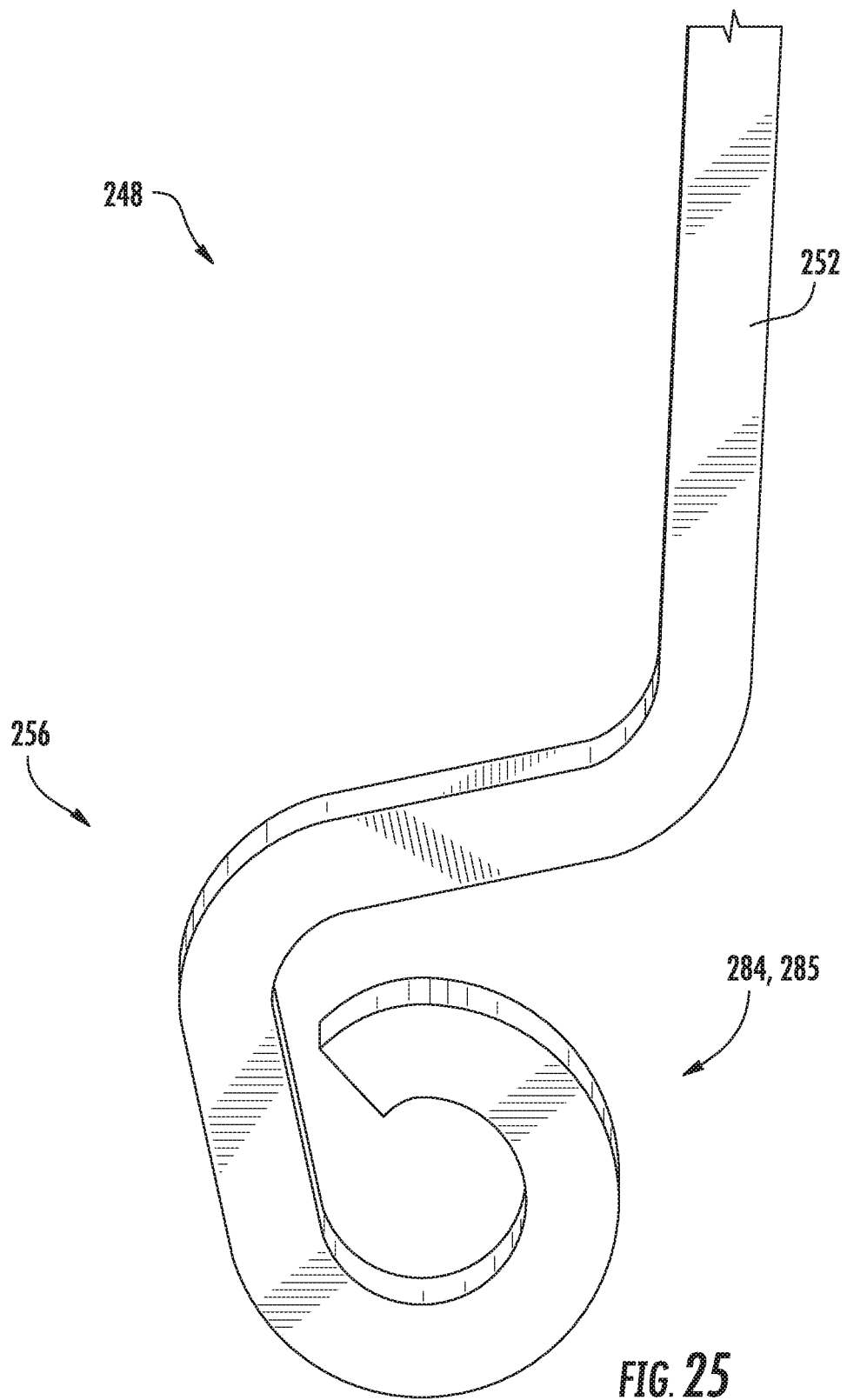
FIG. 25 provides a close up, perspective view of an exemplary bracket having a curl flange.

FIG. 25 provides a close up, perspective view of an exemplary bracket having an open curl flange 350. In particular, this embodiment, the securing mechanism 284 is open curl flange 350. When a bracket having open curl flange 350 is inserted into one of the bottom flange openings and slid laterally, open curl flange 350 may increase the points of contact with bottom flange 234 and may account for varying tolerances from control panel to control panel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electronic control assembly for an appliance defining a vertical direction, a lateral direction, and a transverse direction, the electronic control assembly comprising:
 a control panel having a front side and a rear side and defining a panel opening therethrough, the control panel extending between a top and a bottom along the vertical direction, the control panel further comprising:
  a top wall projecting rearward along the transverse direction from the top of the control panel, the top wall having a top flange projecting therefrom along the vertical direction and extending along the lateral direction, the top flange defining a first slot and a second slot;
  a bottom wall projecting rearward along the transverse direction from the bottom of the control panel, the bottom wall having a bottom flange projecting therefrom along the vertical direction and extending along the lateral direction, the bottom flange defining a first bottom flange opening and a second bottom flange opening;
 a pair of brackets including a first bracket and a second bracket, each bracket positioned on the rear side of the control panel and on opposite sides of the panel opening, each bracket comprising:
  a body extending between a top and a bottom along the vertical direction and including a body tab;
  a top arm extending from the top of the body and including a tab insertable into one of the slots of the top flange for securing the top arm to the control panel; and
  a bottom arm extending from the bottom of the body and insertable into one of the flange openings;
 wherein at least one of the bottom arm of the first bracket and the bottom flange includes a securing mechanism for securing the bottom of the first bracket to the control panel when the first bracket is slid in the lateral direction and wherein at least one of the bottom arm of the second bracket and the bottom flange includes a securing mechanism for securing the bottom of the second bracket to the control panel when the second bracket is slid in the lateral direction;
 a control board sized to fit the panel opening and to overlap each of the brackets, wherein the control board is secured to the brackets at least in part by the body tabs of each bracket; and
 one or more fasteners for further securing the control board in engagement with each of the brackets.

2. The electronic control assembly of claim 1, wherein the control board extends along the lateral direction between a first end and a second end, and wherein the control board includes a first flange positioned at the first end and a second flange at the second end, and wherein the first flange overlaps the first bracket and the second flange overlaps the second bracket.

3. The electronic control assembly of claim 1, wherein the one or more fasteners are screws, and wherein the electronic control assembly requires no more than two (2) screws to fasten the control board to the brackets.

4. The electronic control assembly of claim 1, wherein the first and second brackets are galvanized steel.

5. The electronic control assembly of claim 1, wherein the bottom flange includes one securing mechanism positioned proximate the first bottom flange opening, and wherein the securing mechanism is a tab oriented in the lateral direction and when the first bracket is slid in the lateral direction toward the tab of the bottom flange, the tab of the bottom flange receives the bottom arm of the first bracket such that the bottom arm is secured to the control panel.

6. The electronic control assembly of claim 5, wherein the bottom wall of the control panel defines an emboss protruding in the vertical direction and extending in the lateral direction proximate the first bottom flange opening, and wherein when the first bracket is inserted into the first bottom flange opening and slid in the lateral direction, the emboss constrains the first bracket in the transverse direction.

7. The electronic control assembly of claim 1, wherein the bottom arm of the first bracket includes one securing mechanism, and wherein the securing mechanism is a curl flange oriented in the lateral direction, and wherein when the first bracket is slid in the lateral direction, the curl flange receives the bottom flange of the control panel such that the bottom arm of the first bracket is secured to the control panel.

8. The electronic control assembly of claim 1, wherein the tab of the top arm of one of the first and second brackets is a C-tab.

9. The electronic control assembly of claim 1, wherein the bottom flange includes a transverse flange portion oriented in a plane substantially parallel to the transverse and lateral directions, the transverse flange portion including a slit for receiving the bottom arm of the first bracket when the first bracket is slid in the lateral direction toward the transverse flange portion for securing the bottom arm of the first bracket to the control panel.

10. An electronic control assembly for an appliance defining a vertical direction, a lateral direction, and a transverse direction, the electronic control assembly comprising:
 a control panel having a front side and a rear side and defining a panel opening therethrough, the control panel extending between a top and a bottom along the vertical direction, the control panel further comprising:
  a top wall projecting rearward from the top of the control panel, the top wall having a top flange projecting therefrom along the vertical direction and extending along the lateral direction, the top flange defining a first slot and a second slot;
  a bottom wall projecting rearward from the bottom of the control panel, the bottom wall having a bottom flange projecting therefrom along the vertical direction and extending along the lateral direction, the bottom flange defining a first bottom flange opening and a second bottom flange opening, the bottom flange further defining a first step cutout proximate the first bottom flange opening and a second step cutout positioned proximate the second bottom flange opening;

a pair of brackets, each bracket positioned on the rear side of the control panel and on opposite sides of the panel opening, each bracket comprising:
  a body extending between a top and a bottom along the vertical direction and including a body tab;
  a top arm extending from the top of the body and including a tab insertable into one of the slots of the top flange for securing the top arm to the control panel; and
  a bottom arm extending from the bottom of the body and insertable into one of the bottom flange openings such that the bottom arm can be slid in the lateral direction into locking engagement with one of the step cutouts for securing the bottom arm to the control panel;

a control board sized to fit the panel opening and to overlap each of the brackets, wherein the control board is secured to the brackets at least in part by the body tabs of each bracket; and one or more fasteners for further securing the control board in engagement with each of the brackets.

11. The electronic control assembly of claim 10, wherein the one or more fasteners are screws, and wherein the electronic control assembly requires no more than two (2) screws to fasten the control board to the brackets.

12. The electronic control assembly of claim 10, wherein the tab of each bracket is an S-tab.

13. The electronic control assembly of claim 10, wherein the bottom arm includes a hem flange configured to lock each of the brackets in place when they are slid into their respective first and second step cutouts.

14. The electronic control assembly of claim 10, wherein the control panel defines a lateral centerline along the lateral direction, and wherein the first step cutout is positioned laterally inward of the first bottom flange opening and the second step cutout is positioned laterally inward of the second bottom flange opening, and wherein the first step cutout is vertically aligned with the first slot of the top flange and the second step cutout is vertically aligned with the second slot of the top flange.

15. The electronic control assembly of claim 10, wherein each step cutout includes a first rise edge extending along the vertical direction and a tread edge extending along the lateral direction, wherein a chamfered edge connects the first rise edge with the tread edge.

16. The electronic control assembly of claim 10, wherein the bottom wall of the control panel defines one emboss protruding in the vertical direction and extending along the lateral direction proximate the first bottom flange opening and one emboss protruding in the vertical direction and extending along the lateral direction proximate the second bottom flange opening, each emboss configured to constrain their respective first and second brackets in the transverse direction when the first and second brackets are inserted into their respective first and second bottom flange openings.

17. The electronic control assembly of claim 10, wherein each step cutout includes a first rise edge extending along the vertical direction, a tread edge extending from the first rise edge along the lateral direction, and a second rise edge extending from the tread edge along the vertical direction, and wherein the bottom arm includes a hem flange configured to secure each of the brackets in locking engagement with the bottom flange when they are slid into their respective first and second step cutouts, and wherein the hem flange of each bracket mates with the tread edge.

18. The electronic control assembly of claim 10, wherein the control panel defines a lateral centerline along the lateral direction, and wherein the first step cutout is positioned laterally outward of the first bottom flange opening with respect to the lateral centerline and the second step cutout is positioned laterally outward of the second bottom flange opening with respect to the lateral centerline.

19. An electronic control assembly for an appliance, the electronic control assembly comprising:
  a control panel including a main panel having a front side and a rear side and defining a panel opening therethrough, the main panel extending between a top and a bottom, the control panel further comprising:
    a top flange spaced apart from the main panel, the top flange defining a first slot and a second slot;
    a top wall extending between the main panel and the top flange;
    a bottom flange spaced apart from the main panel, the bottom flange defining a first bottom flange opening and a second bottom flange opening;
    a bottom wall extending between the main panel and the bottom flange;
  a pair of brackets including a first bracket and a second bracket, each bracket positioned on the rear side of the main panel and on opposite sides of the panel opening, each bracket comprising:
    a body extending between a top and a bottom and including a body tab;
    a top arm extending from the top of the body and including a tab insertable into one of the slots of the top flange for securing the top arm to the control panel; and
    a bottom arm extending from the bottom of the body and insertable into one of the flange openings;
  wherein at least one of the bottom arm of the first bracket and the bottom flange includes a securing mechanism for securing the bottom of the first bracket to the control panel when the bottom arm is slid into engagement with the bottom flange and wherein at least one of the bottom arm of the second bracket and the bottom flange includes a securing mechanism for securing the bottom of the second bracket to the control panel when the bottom arm is slid into engagement with the bottom flange;
  a control board sized to fit the panel opening and to overlap each of the brackets, wherein the control board is secured to the brackets at least in part by the body tabs of each bracket; and
  one or more fasteners for further securing the control board in engagement with each of the brackets.

20. The electronic control assembly of claim 19, wherein the securing mechanism is an open curl flange.

* * * * *